(12) United States Patent
Perlo et al.

(10) Patent No.: US 12,448,125 B2
(45) Date of Patent: Oct. 21, 2025

(54) AIRCRAFT, IN PARTICULAR A PERSONAL AIR MOBILITY AIRCRAFT OR DRONE, AN ANNULAR PROPELLER UNIT, AND A BOAT COMPRISING THIS UNIT

(71) Applicant: INTERACTIVE FULLY ELECTRICAL VEHICLES S.R.L., Turin (IT)

(72) Inventors: Pietro Perlo, Turin (IT); Davide Penserini, Turin (IT)

(73) Assignee: INTERACTIVE FULLY ELECTRICAL VEHICLES S.R.L., Turin (IT)

( * ) Notice: Subject to any disclaimer, the term of this patent is extended or adjusted under 35 U.S.C. 154(b) by 21 days.

(21) Appl. No.: 18/552,120

(22) PCT Filed: Mar. 3, 2022

(86) PCT No.: PCT/IB2022/051877
§ 371 (c)(1),
(2) Date: Sep. 22, 2023

(87) PCT Pub. No.: WO2022/200883
PCT Pub. Date: Sep. 29, 2022

(65) Prior Publication Data
US 2024/0166344 A1 May 23, 2024

(30) Foreign Application Priority Data
Mar. 24, 2021 (IT) .................. 102021000007181

(51) Int. Cl.
*B64C 29/02* (2006.01)
*B63H 1/14* (2006.01)
(Continued)

(52) U.S. Cl.
CPC ............ *B64C 29/02* (2013.01); *B64C 11/001* (2013.01); *B64C 29/0025* (2013.01);
(Continued)

(58) Field of Classification Search
CPC ..... B63H 1/14; B64C 11/001; B64C 29/0025; B64C 29/02; B64C 39/06; B64D 2221/00;
(Continued)

(56) References Cited

U.S. PATENT DOCUMENTS 2,635,833 A * 4/1953 Rzepela ............. B64C 29/0025
244/12.5
4,828,203 A * 5/1989 Clifton ................ B64C 29/0033
244/12.3
(Continued)

FOREIGN PATENT DOCUMENTS

JP 2001097288 A 4/2001
WO 9420362 A1 9/1994
WO 2020261102 A1 12/2020

OTHER PUBLICATIONS

International Search Report and Written Opinion of International Application No. PCT/IB2022/051877, mailed on May 10, 2022, 14 pages.

*Primary Examiner* — Joshua J Michener
*Assistant Examiner* — Michael B. Kreiner
(74) *Attorney, Agent, or Firm* — Heslin Rothenberg Farley and Mesiti, PC; Victor A. Cardona, Esq.

(57) ABSTRACT

An aircraft, in particular a personal air mobility aircraft or a drone, having one or more annular propellers, with one or more blades extending radially from a rotor ring body towards the axis of the rotor ring, and one or more belt transmissions, which connect the rotor ring of each annular propeller with the output shaft of a motor unit including an electric motor. Various aircraft configurations include a
(Continued)

vertical take-off and horizontal flight configuration. The aircraft surfaces are covered by groups of photovoltaic solar cells connected to a main battery pack for powering the electric motors that drive the annular propellers, and to an auxiliary electric battery for powering the on-board electrical circuit.

19 Claims, 38 Drawing Sheets

(51) Int. Cl.
| | |
|---|---|
| *B64C 11/00* | (2006.01) |
| *B64C 29/00* | (2006.01) |
| *B64D 27/34* | (2024.01) |
| *B64D 27/353* | (2024.01) |
| *B64D 27/357* | (2024.01) |
| *B64D 35/021* | (2024.01) |
| *B64U 10/20* | (2023.01) |
| *B64U 30/27* | (2023.01) |
| *B64U 30/295* | (2023.01) |

(52) U.S. Cl.
CPC ........... *B64D 27/34* (2024.01); *B64D 27/353* (2024.01); *B64D 27/357* (2024.01); *B64D 35/021* (2024.01); *B64U 30/27* (2023.01); *B63H 1/14* (2013.01); *B64U 10/20* (2023.01); *B64U 30/295* (2023.01)

(58) Field of Classification Search
CPC .... B64D 27/34; B64D 27/353; B64D 27/357; B64D 35/021; B64D 35/023; B64D 35/04; B64D 35/08; B64U 10/20; B64U 30/27; B64U 30/295

See application file for complete search history.

(56) References Cited

U.S. PATENT DOCUMENTS

| | | | | |
|---|---|---|---|---|
| 5,454,531 | A | * | 10/1995 | Melkuti .............. B64C 29/0025 244/12.6 |
| 6,620,003 | B2 | | 9/2003 | Mardikian |
| 6,843,447 | B2 | * | 1/2005 | Morgan .................... B64C 5/02 244/12.3 |
| 6,886,776 | B2 | * | 5/2005 | Wagner ..................... B64C 3/56 244/12.4 |
| 7,249,732 | B2 | * | 7/2007 | Sanders, Jr. ........... B64U 10/13 244/12.1 |
| 8,421,283 | B2 | * | 4/2013 | Stoehling ................. H02K 5/24 310/90 |
| 9,714,090 | B2 | * | 7/2017 | Frolov ................ B64C 29/0025 |
| 10,151,302 | B2 | * | 12/2018 | Takahashi ............... F03D 15/10 |
| 10,450,063 | B1 | * | 10/2019 | Randall .................. B64C 39/062 |
| 10,814,974 | B2 | * | 10/2020 | Randall .................. B64C 39/008 |
| 11,034,443 | B2 | * | 6/2021 | Frolov ................. B64U 30/295 |
| 11,821,338 | B2 | * | 11/2023 | Balan ..................... B63H 5/125 |
| 11,945,610 | B2 | * | 4/2024 | Perlo ...................... B64C 11/48 |
| 2006/0196991 | A1 | | 9/2006 | Martin |
| 2007/0018037 | A1 | * | 1/2007 | Perlo ...................... B64C 39/08 244/45 R |
| 2016/0010732 | A1 | * | 1/2016 | Blevins ................... F16H 55/17 475/331 |
| 2018/0178898 | A1 | | 6/2018 | Cornew et al. |
| 2020/0062385 | A1 | | 2/2020 | Randall |

* cited by examiner

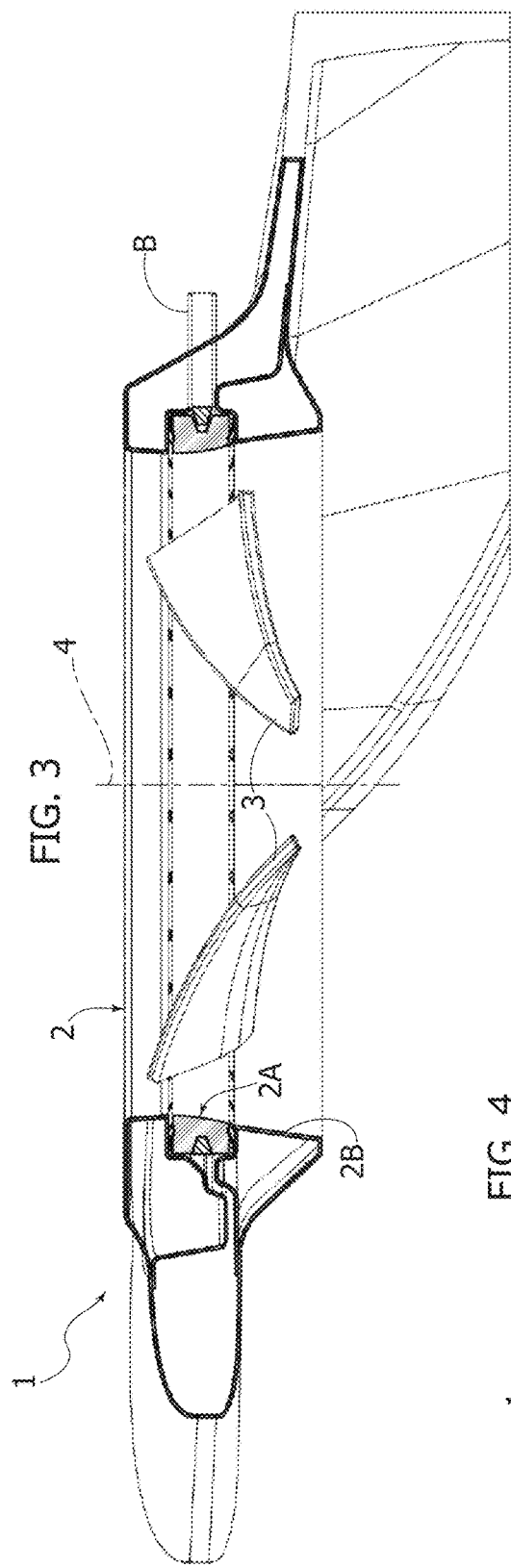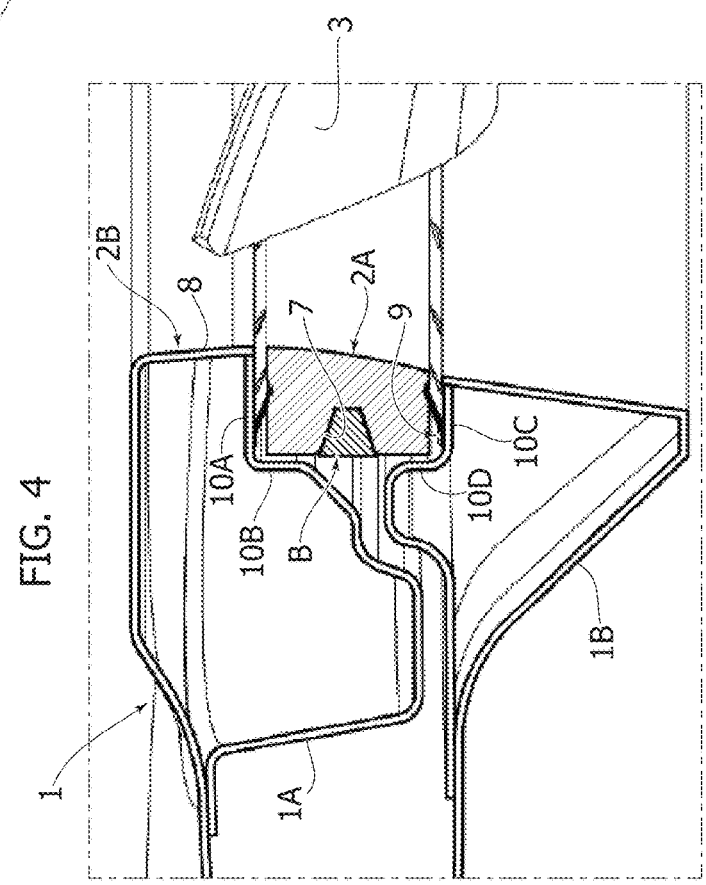

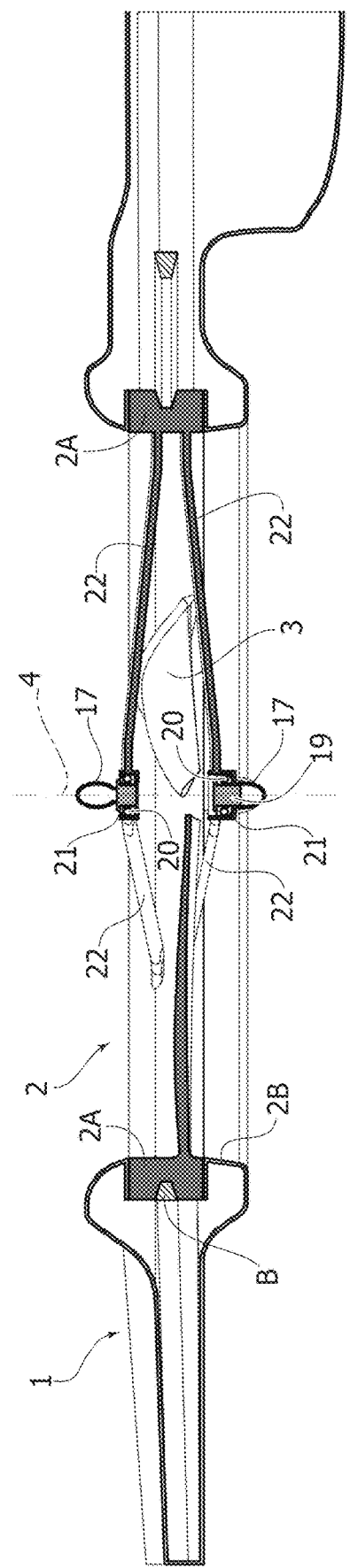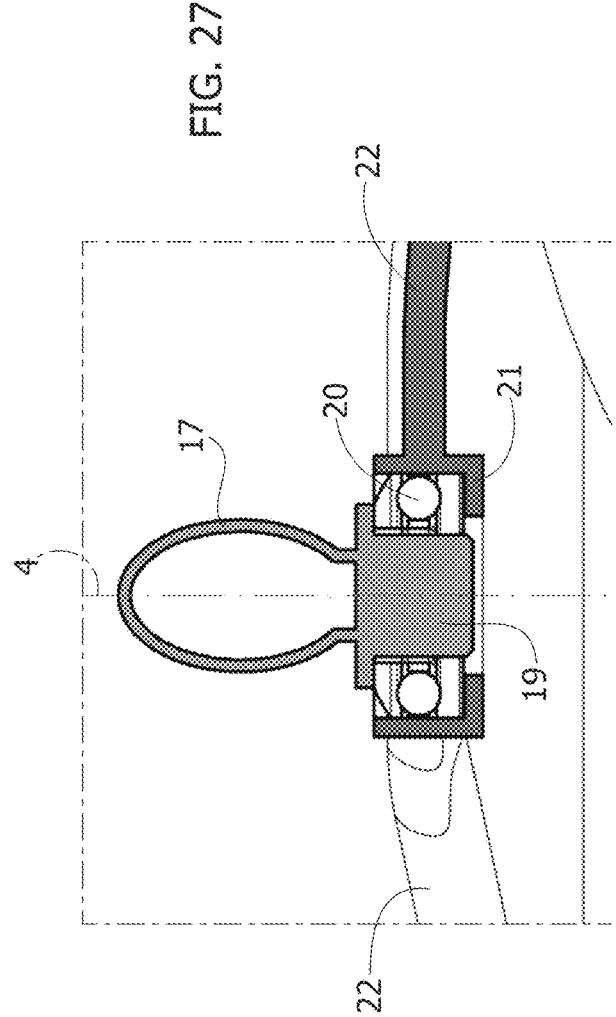

AIRCRAFT, IN PARTICULAR A PERSONAL AIR MOBILITY AIRCRAFT OR DRONE, AN ANNULAR PROPELLER UNIT, AND A BOAT COMPRISING THIS UNIT

CROSS REFERENCE TO RELATED APPLICATIONS

This application is a national stage filing under Section 371 of International Application No. PCT/IB2022/051877, filed Mar. 3, 2022, published in English on Sep. 29, 2022, as WO 2022/200883 and which claims priority from Italian Patent Application No. 102021000007181 filed on Mar. 24, 2021, the entire disclosures of which are incorporated herein by reference.

FIELD OF THE INVENTION

The present invention relates to aircraft, in particular to personal air mobility aircraft and to drones. The invention also relates to an annular propeller unit that can be used in an aircraft of this type, as well as a boat using this of annular propeller unit.

PRIOR ART

In recent years, various types of drones and small aircraft have been proposed for personal air mobility. A common drawback in the solutions that have appeared to date lies in the poor efficiency of the propulsion rotors, in the constructive complication of the motor systems for driving the rotors, and in the relatively reduced autonomy.

Pietro Perlo, one of the present inventors, has been working since many years on studies and investigations aimed at achieving high efficiency propulsion rotors. For example, the document EP 1 524 189 A1 relates to a micro-aircraft that can be associated with a mobile phone, and comprising a substantially planar structure wherein four ducted propulsion rotors are incorporated, which are substantially coplanar with each other. Each of the four propulsion rotors comprises a rotating ring rotatably mounted within a cylindrical opening with a vertical axis, formed through the planar structure, and defines a guiding duct for the airflow generated by the rotor. Each of the four rotors comprises at least one blade, which extends radially from the body of the rotating ring towards the central axis of the rotor. The known solution described above was developed for an aircraft of microscopic dimensions and, therefore, did not involve the solution of the far more significant problems encountered in the case of a self-driving drone, intended for example for transporting loads (for example, for delivering parcels), or an aircraft for personal air mobility.

One example of application of the concepts set out above to a personal air mobility aircraft has already been proposed by the same Applicant in document WO 2020/261102.

An aircraft having the characteristics of the prior art is known from US 2020/062385A1. The aircraft described in this document has a rotor driven by toothed wheels or rollers in frictional engagement with the outer surface of one or more belts applied around the rotor.

A belt transmission for driving a helicopter rotor is schematically illustrated in JP2001097288A, however, without any explanation as to how this solution can be concretely implemented.

Other known solutions are illustrated in US 2006/196991 A1 and US 2018/178898 A1.

OBJECT OF THE INVENTION

The object of the present invention is to improve the solution proposed in WO 2020/261102.

In particular, an object of the invention consists of producing a personal air mobility aircraft, or a drone that has a drive system of the propulsion rotors characterized by high efficiency, in particular, in terms of the high thrust/weight ratio for the same value as the diameter of the propulsion rotor.

Another object of the invention is to propose an aircraft of the type specified above wherein the drive system of the propulsion rotors is characterized by an extremely low noise level.

Another object of the invention is to provide an aircraft of the type specified above wherein the drive system of the propulsion rotors is constructively simple and of low cost, and at the same time reliable.

Still another object of the invention is to propose a series of preferred configurations for an aircraft for personal air mobility aircraft having extremely high lift characteristics and anti-stall characteristics.

SUMMARY OF THE INVENTION

In order to achieve one or more of the aforesaid objects, the invention relates to an aircraft having the characteristics described herein.

The invention also relates to an annular propeller unit. The annular propeller unit according to the invention can be used in any type of vehicle and, in particular, also in a boat.

DETAILED DESCRIPTION OF THE INVENTION

The invention will now be described with reference to the attached drawings, provided purely by way of non-limiting example, wherein:

FIG. 1 is a partially cross-sectioned perspective view of a wing of an aircraft according to the invention, FIG. 2 illustrates a variant of FIG. 1.

FIG. 3 is a cross-sectional view of the annular propeller illustrated in FIGS. 1, 2, FIG. 4 illustrates an enlarged detail of FIG. 3, FIG. 5 illustrates a variant of FIG. 3, FIG. 6 illustrates the same cross-section of FIG. 3 according to a different embodiment, FIG. 7 is a perspective view of the wing equipped with an annular propeller made according to the embodiment of FIG. 6, FIG. 8 is a partial perspective view of a leaf spring used in the annular propeller of FIG. 7, FIGS. 9, 10 are a side view and a plan view of the leaf spring of FIG. 8, FIG. 11 is a partial perspective and enlarged-scale view of a cup spring used in another embodiment of the invention, FIG. 12 is an additional partial perspective view of the cup spring of FIG. 11, FIG. 13 illustrates a variant of FIG. 12, FIG. 14 illustrates a cross-section of the annular propeller in the embodiment using the cup spring of FIG. 12, in the condition wherein the rotor ring is stationary, FIG. 15 illustrates the same cross-section as FIG. 14 in the condition wherein the rotor ring is in motion, FIG. 16 is an overall view of the annular propeller using the cup spring of FIG. 12, FIG. 17 is a partially cross-sectioned perspective view of a ball support of the type used to support the rotor ring in rotation in another embodiment of the invention, FIG. 18 is an enlarged scale view of a detail of a cross-section of the rotor ring in an embodiment using horizontally oriented ball supports of the type illustrated in FIG. 17, FIG. 19 is a variant of FIG. 18, FIG. 20 is a view of another embodiment of an annular propeller used in the aircraft according to the invention, FIG. 21 is a partial cross-sectional view of the annular propeller of FIG. 20, FIG. 22 illustrates an enlarged detail of FIG. 21, FIG. 23 illustrates a variant of FIG. 21.

FIG. 24 illustrates a variant of FIG. 21.

FIG. 25 is a perspective view of another embodiment of a propeller used in the aircraft according to the invention, FIG. 26 is a cross-sectional view of the propeller of FIG. 25, FIG. 27 is a view, on an enlarged scale, of a detail of FIG. 26, FIG. 28 is a perspective view of another embodiment of the propeller used in the aircraft according to the invention, FIG. 29 is a cross-sectional view of the propeller of FIG. 28, FIG. 30 illustrates a wing of an aircraft according to the invention provided with two propellers driven by the same motor unit, FIGS. 31, 32 are two perspective views of a first configuration of the aircraft according to the invention, FIGS. 33-37 are perspective views of additional configurations of the aircraft according to the invention, FIG. 38 is a perspective view of a variant wherein the same rotor is driven by two electric motors by means of the same transmission belt, FIG. 39 is a perspective view of another variant wherein the rotor is driven by an electric motor by means of a transmission belt, which also engages an auxiliary pulley located on the opposite side of the rotor with respect to the motor, FIGS. 40, 41 show additional variants of the propulsion system of the aircraft rotors according to the invention, FIGS. 42, 43 show the flight attitude and take-off/landing attitude of a further embodiment of the aircraft of the invention, FIGS. 44, 45 show the flight attitude and take-off/landing attitude of a further embodiment of the aircraft of the invention, FIGS. 46, 47 are two alternative diagrams of the connection circuit between the photovoltaic cells of the aircraft and the on-board electric batteries, FIG. 48 is a schematic cross-sectional view showing the layering of the laminar structure, incorporating photovoltaic solar cells, which is applied to the surfaces of the aircraft.

FIG. 49 is a perspective view of an embodiment example of a boat using two annular propeller units according to the invention, FIGS. 50, 51 are two additional perspective views of the boat of FIG. 49 with retracted and extracted hydrofoil, respectively, FIG. 52 is another perspective view of the boat of FIG. 49, which transparently shows the battery pack for electrically powering the electric drive motors driving the propeller units, FIG. 53 is a schematic perspective view of the propulsion system and hydrofoils of the boat of FIG. 49, FIG. 54 is a rear view of the boat, and FIG. 55 illustrates an enlarged detail of FIG. 54.

With reference to FIGS. 1-4, an embodiment example of the aircraft according to the invention comprises a wing 1 in which an annular propeller 2 is incorporated. As can be seen in detail in FIG. 4, the annular propeller 2 comprises a rotor ring 2A mounted rotatably within a stationary ring 2B defined by the structure of the wing 1. The rotor ring 2A carries one or more blades 3 (the example refers to the case of three blades), which extend radially from the rotor ring 2A towards the axis 4 of the propeller 2. In a preferred embodiment, the blades 3 are of the variable pitch type, with a variable angle of attack. The pitch may also become negative, to obtain a reversal of the thrust (reversible propeller).

The rotation of the rotor ring 2A is controlled by a motor unit P by means of a belt transmission 5. In the example of FIG. 1, the motor unit P is constituted by an electric motor M with radial flux or axial flux of a high torque motor.

In the example of FIG. 2, the motor unit P comprises an electric motor M and a reducer unit R. In both cases, a pulley 6 is mounted on the output shaft of the motor unit P to engage a closed loop belt B, which is also engaged on the lateral surface of the rotor ring 2A. If the motor is of the "torque motor" type, the rotor can integrate the pulley itself.

The stationary ring defined by the supporting structure 1 has one or more openings for the passage of the belt B. In the example of FIGS. 1-4, the stationary ring has an inner circumferential wall surrounding the rotor ring 2A, which is interrupted for an entire sector of the circumferential extension, so as not to interfere with the belt B.

As can be seen in detail in FIG. 4, in the example illustrated, the lateral surface of the rotor ring 2A has a circumferential groove 7 for engaging the belt B. In one example, the transmission belt B has a body of elastomeric material and includes one or more metal wires (not shown).

In the example illustrated in the drawings, the belt B has a trapezoidal cross-section and the cavity 7 that receives it has a cross-section of corresponding shape.

As also visible in FIG. 4, the stationary ring 2B has an inner circumferential wall defining a cylindrical duct surface of the annular propeller, which serves to guide the flow of air generated by the rotation of the rotor ring.

In the specific illustrated example, the structure of the wing 1 has an upper part 1A and a lower part 1B (see FIG. 4). The parts 1A, 1B of the wing structure define a circumferential cavity within which the rotor ring 2A is rotatably mounted in such a way as to leave the lateral surface of the rotor ring 2A free, where it is engaged by the belt B.

Still with reference to FIG. 4, the rotor ring 2A is rotatably mounted within a circumferential groove 9 defined by the structure of the wing 1. In particular, the circumferential cavity 9 is delimited by an upper wall 10A and a side wall 10B forming part of the upper portion 1A of the structure 1, as well as by a lower wall 10C and a side wall 10D defined by the upper and lower portions 1A, 1B of the wing structure 1. As can be seen in FIG. 4, the side walls 10B, 10D are configured in such a way as to leave the central part of the side surface of the rotor ring 2A free for engaging the belt B.

FIG. 4 does not show in detail the means that support the rotor ring 2A in rotation within the cavity 9, which will be described below.

As indicated above, the blades 3 are of the variable pitch type and—to this end—they are supported rotatably about their longitudinal axes, this rotation being controlled by an actuator device (not illustrated). These construction details are not illustrated here, since they can be made in any known way, and also to make the drawings simpler.

As in all the embodiments illustrated here, the inner circumferential surface 200 of the rotor ring 2A has a predetermined profile to guide the airflow generated by the propeller. Similarly, the inner circumferential walls 8A, 8B of the structure portions 1A, 1B have profiles which extend on opposite sides of the profile of the inner surface 200 of the rotor ring, in such a way that the set of the circumferential surfaces 8A, 200, 8B defines the duct for conveying the airflow generated by the propeller.

Figure 6:
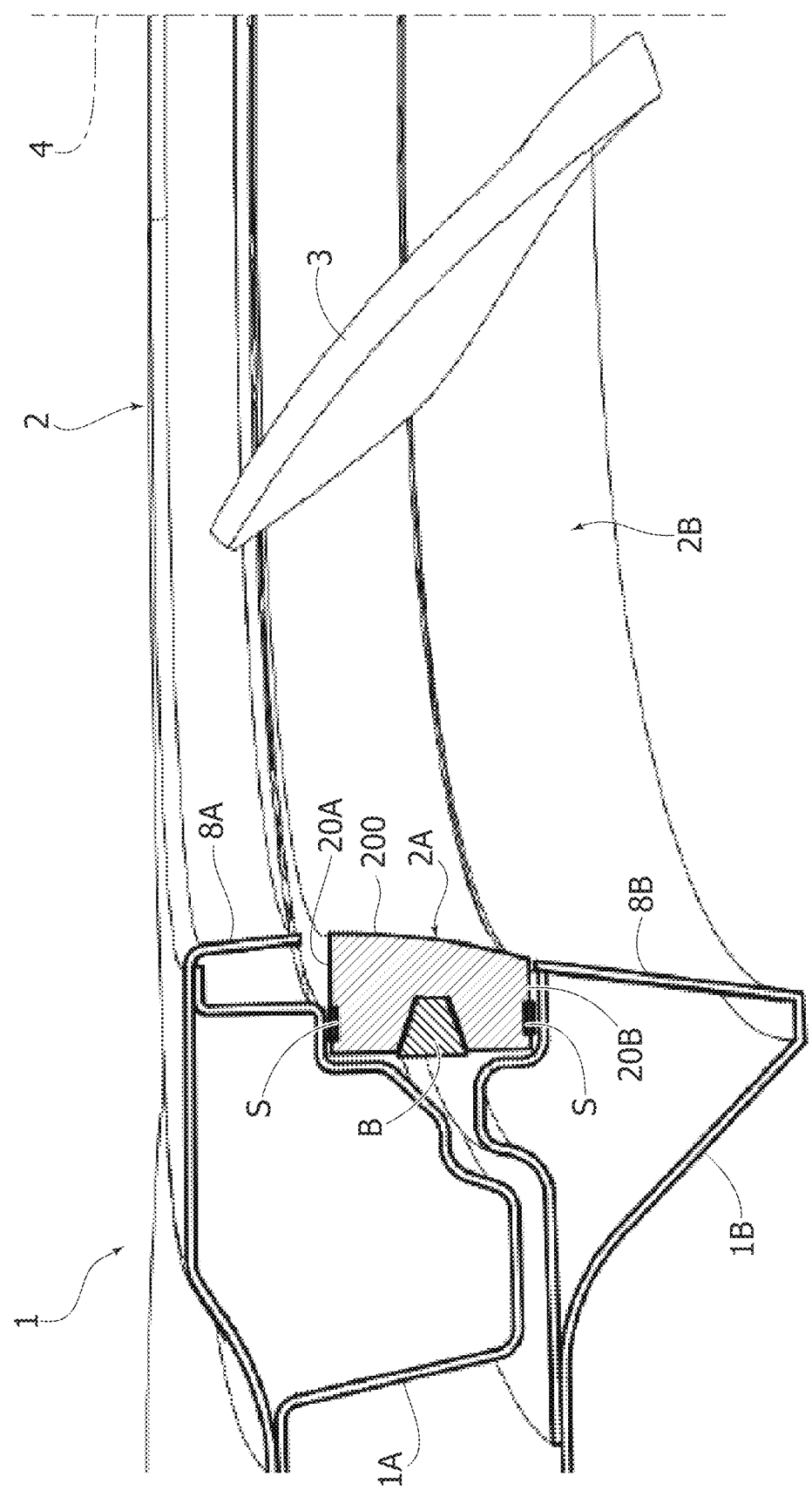
FIG. 6 illustrates a cross-sectional view corresponding to that of FIG. 4, and shows an embodiment example of the means for supporting the rotor ring 2A in rotation.

In the embodiment illustrated in FIG. 6, the rotating support of the rotor ring 200 is obtained by providing a seat on the upper circumferential surface 20A and on the lower circumferential surface 20B of the body of the rotor ring 2A, said seat receives a wavy leaf spring S.

Figure 7:
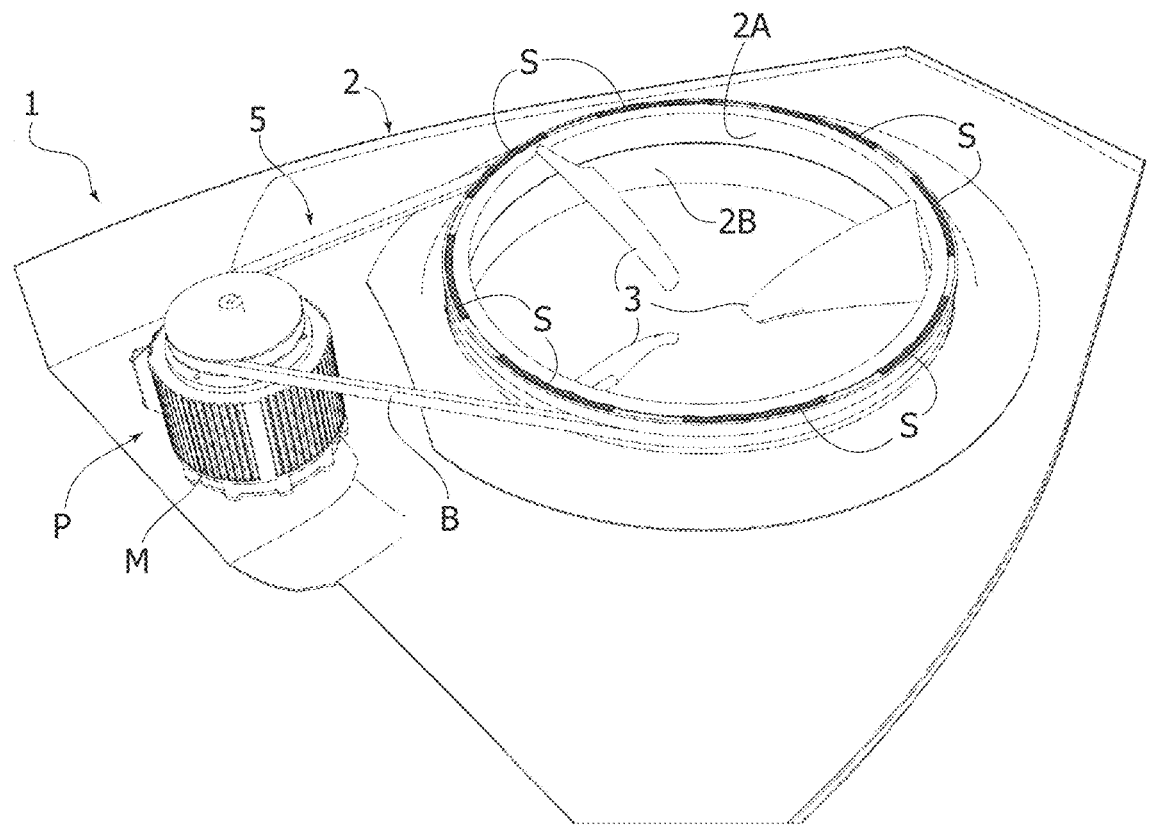

FIG. 7 illustrates an example wherein segments of wavy leaf S, separated from each other, are provided on the upper surface 20A and on the lower surface 20B of the body of the rotor ring 2A. Alternatively, a single wavy elastic leaf element S can be provided extending along the entire circumference of the rotor ring, both on the upper surface 20A and on the lower surface 20B.

Figure 8:
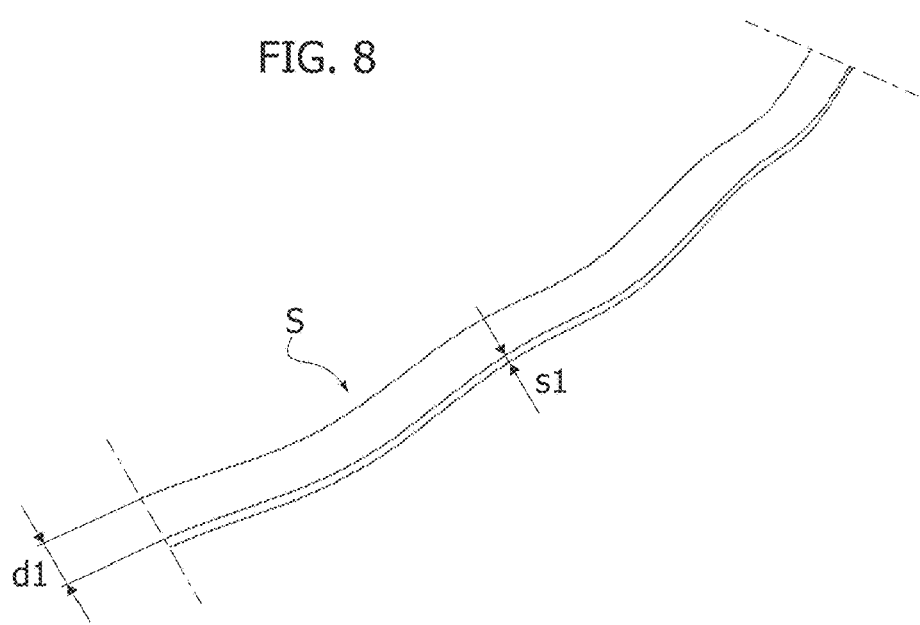
Figure 9:
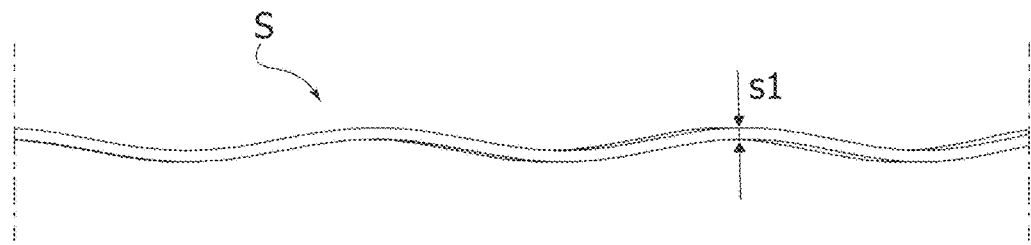

FIG. 8 shows a portion of a wavy elastic leaf element S, having a width $d_1$ and a thickness $s_1$. FIG. 9 shows a side view of the element S, and FIG. 10 shows a plan view.

Both in the case of a single circumferential leaf and in the case of several leaf segments, in the static condition of the rotor ring, the rotor ring rests against the walls of the stationary ring that face the leaf S at the points of culmination, spaced apart from each other, of the successive undulations of the leaf. When the rotor ring is set in rotation by the motor unit, the wavy elastic leaf (or the wavy elastic leaves) stretches away from the rotor ring, which thus rotates on an air cushion. The leaf also performs an aerodynamic function by favoring the formation of a flow of air which keeps the facing surfaces of the leaf, or leaves, and the stationary structure separate. In other words, a sort of air support of the rotor ring during its rotation is achieved in this way.

Figure 10:
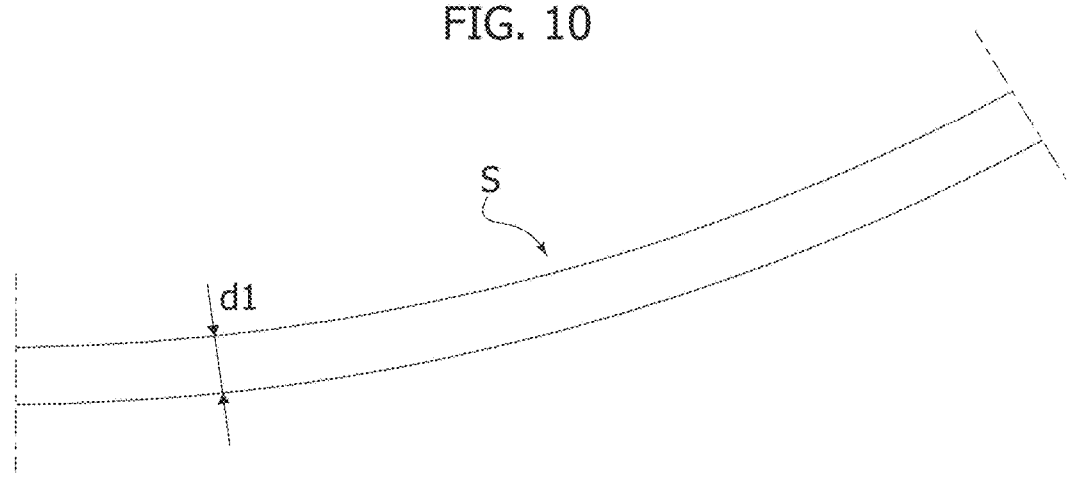
Figure 11:
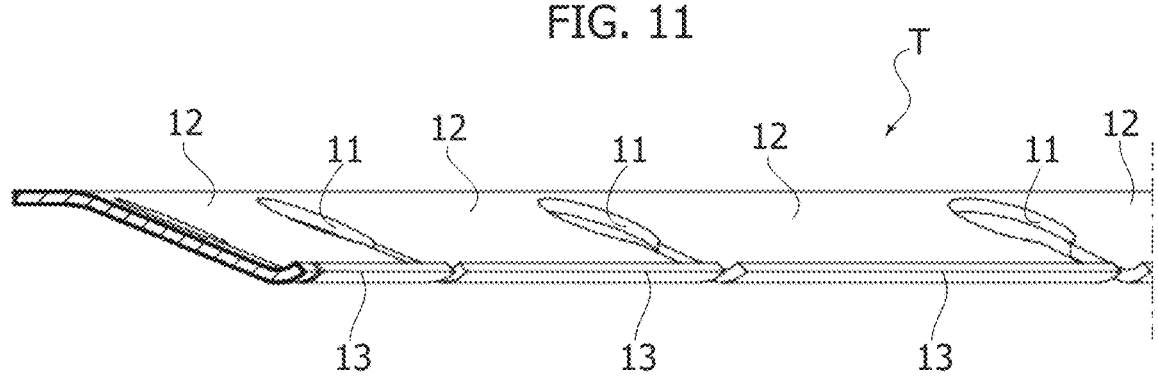
Figure 12:
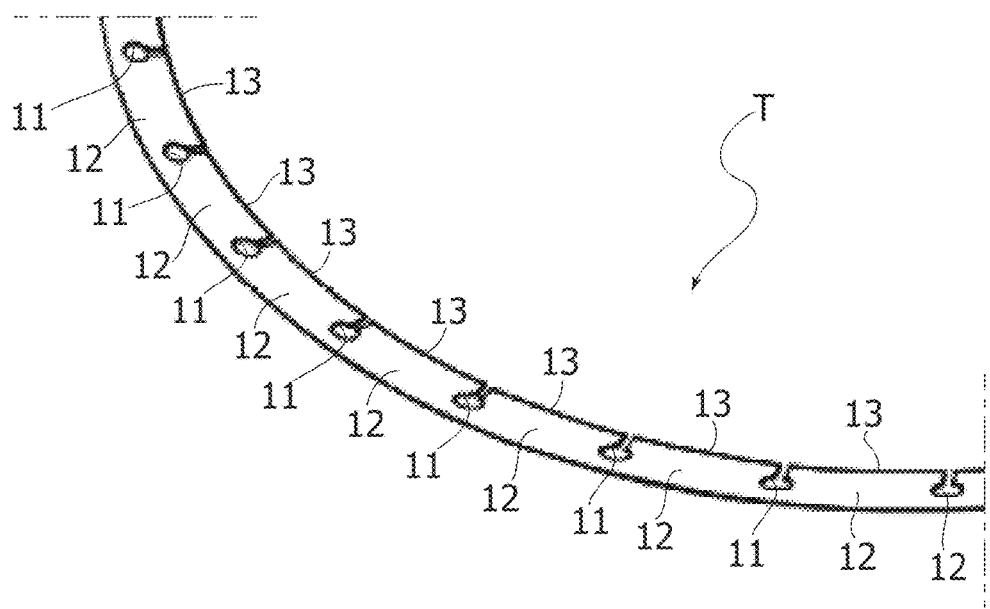
Figure 13:
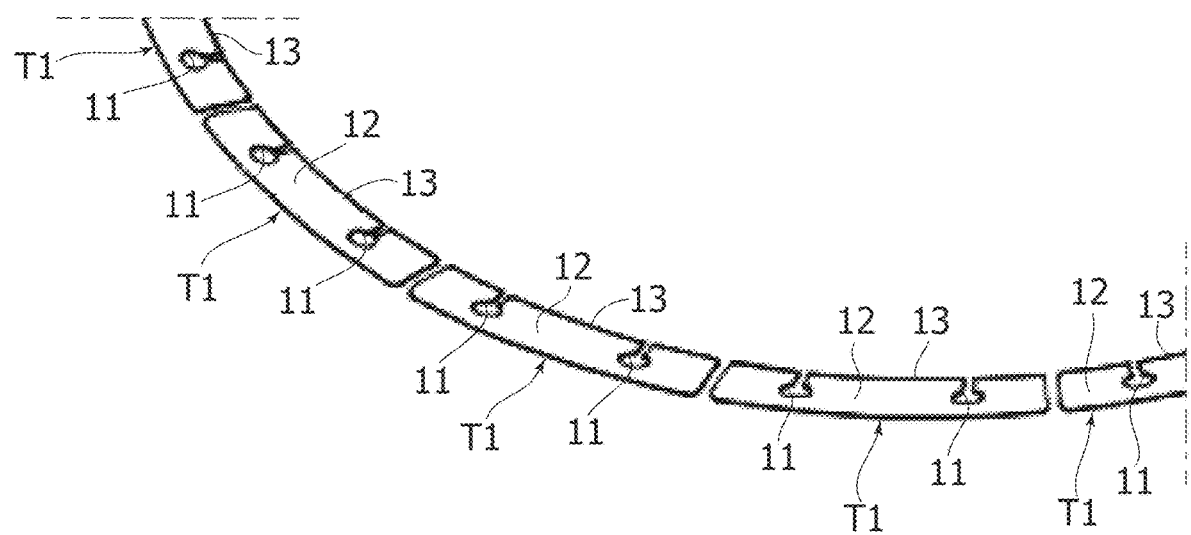

FIGS. 11-16 illustrate another embodiment, wherein for the rotor support of the rotor ring 2A, the rotor ring is provided with a cup spring T, instead of the wavy elastic leaf S of FIGS. 8-10. In this case, both on the upper surface 20A of the body of the rotor ring 2A, and on the lower surface 20B, there is a cup spring T consisting of a single metal leaf, which extends circumferentially above the rotor ring 2A or of multiple leaf segments. As can be seen in FIG. 11, the metal leaf T has a distribution of notches 11 which define a plurality of separate leaf portions 12 which have a folded edge 13 on their radially inner side. The circumferential assembly of the folded edges 13 constitutes a cup spring, substantially conical in shape. FIG. 12 illustrates the case wherein a single leaf T with circumferential extension is provided, while FIG. 13 illustrates the case in which several leaf segments T1 are provided.

Figure 14:
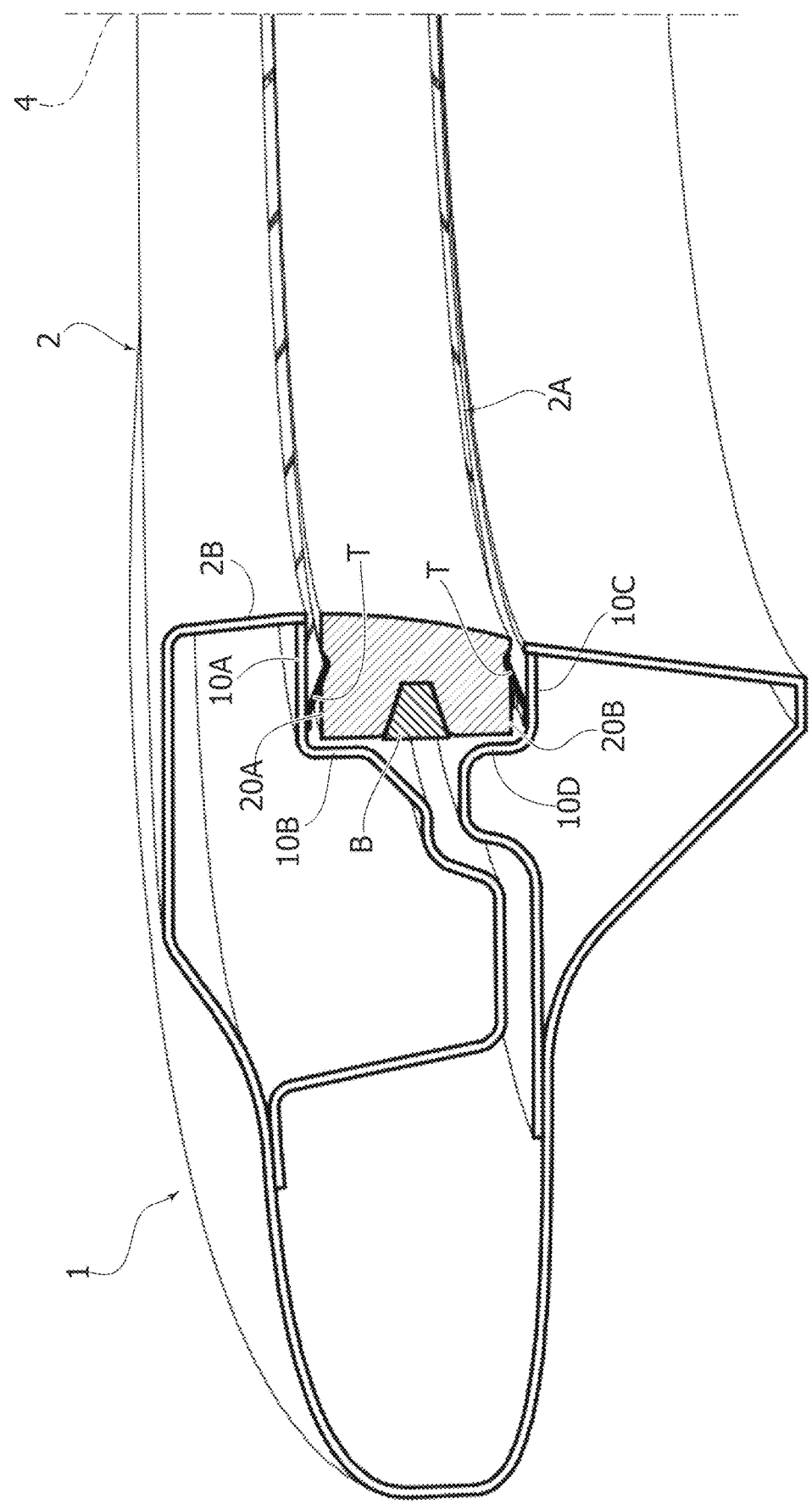
Figure 15:
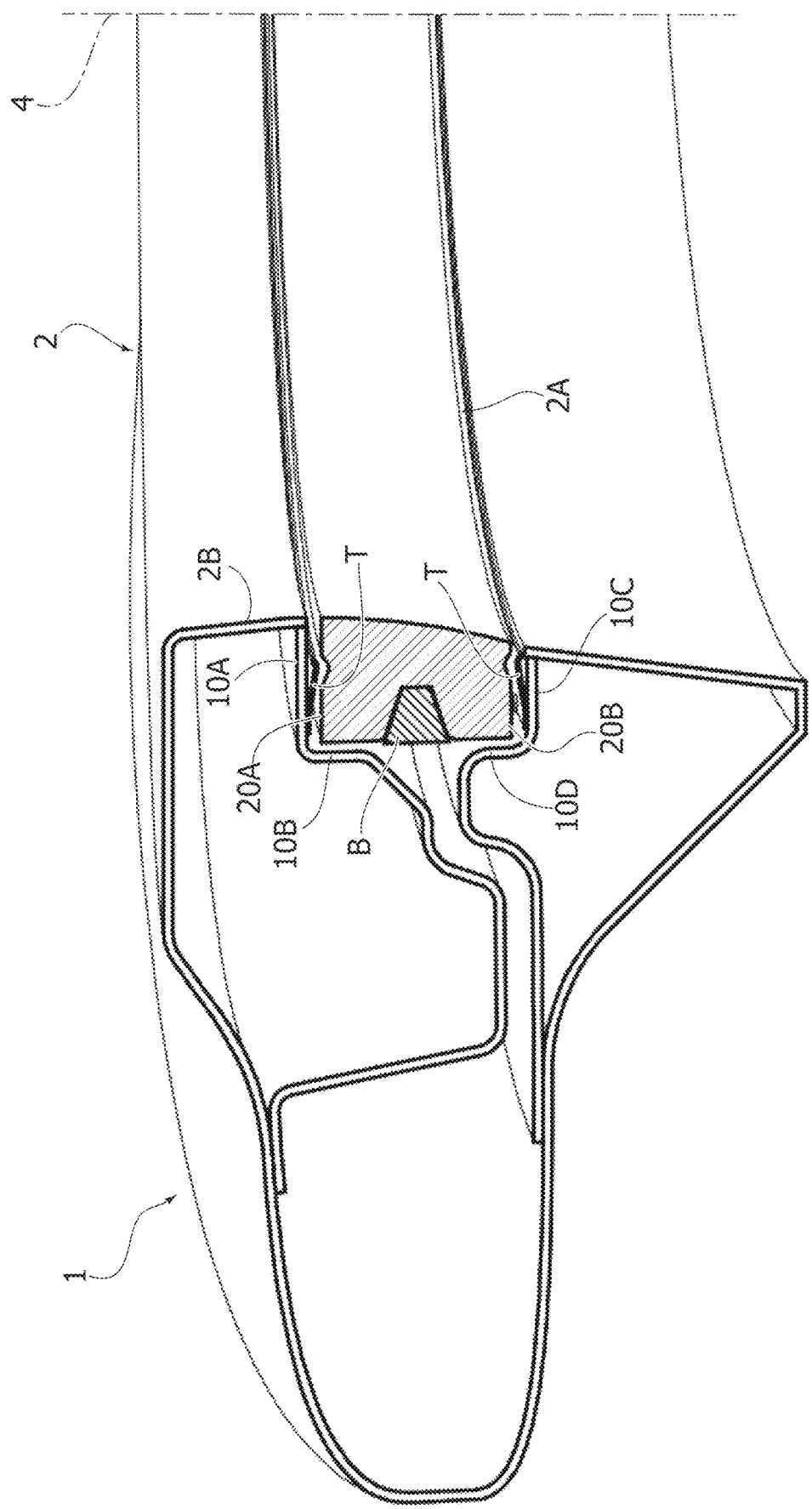
Figure 16:
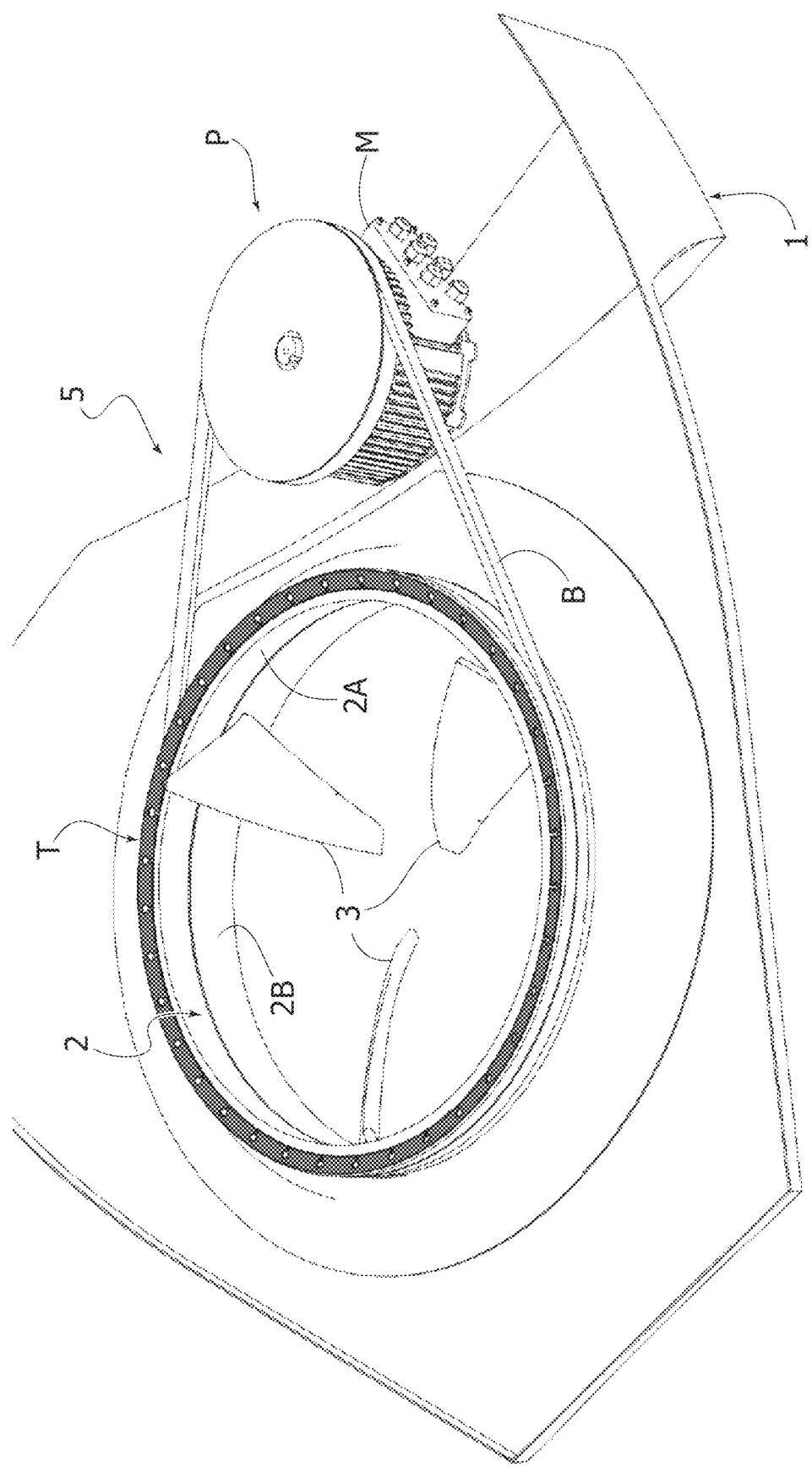

FIGS. 13, 14 show the configuration assumed by the cup spring T in the stationary rotor ring condition (FIG. 14) and in the moving rotor ring condition (FIG. 15).

Figure 17:
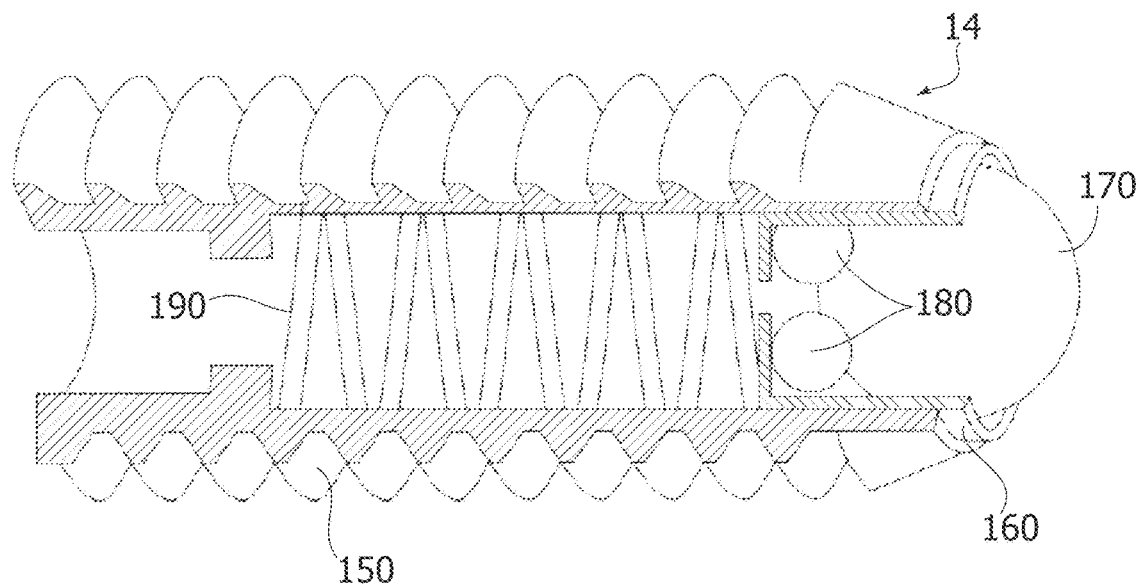

In some additional embodiments, the rotor ring 2A can be supported in rotation by the stationary structure of the aircraft by means of rolling ball supports of the type illustrated in FIG. 17.

FIG. 17 shows a rolling ball support device, indicated overall with the reference number 14. The device 14 comprises a hollow cylindrical body 150, which in the example is shaped like a bellows, inside which a cylindrical casing 160 is slidably mounted, within which a metal ball 170 is freely rotatable, by means of auxiliary balls 180. The ball 170 is retained within the casing 160 and protrudes from one end of the casing. At the opposite end, the casing 160 is pushed by a helical spring 190 contained within the hollow body 150, which tends to keep the ball 170 in a stroke-end position protruding from the body 150.

Figure 18:
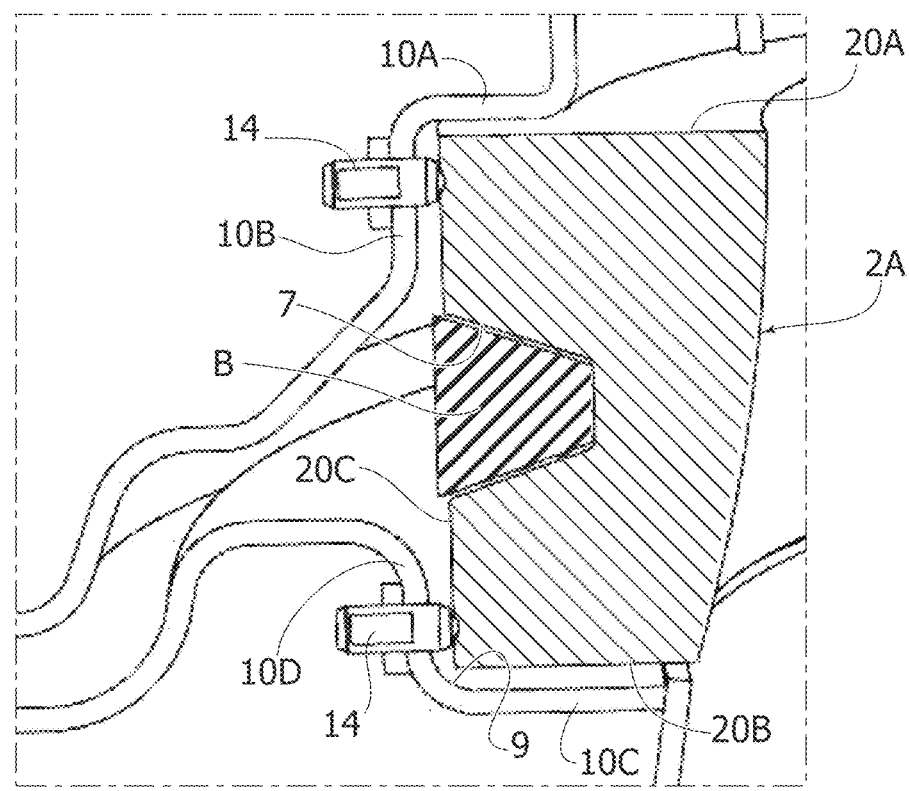

FIG. 18 illustrates a first embodiment wherein two circumferential arrays of devices 14 for supporting rolling balls are provided, arranged horizontally, with the ball of each device 14 in contact with the outer lateral surface 20C of the rotor ring 2A.

Figure 19:
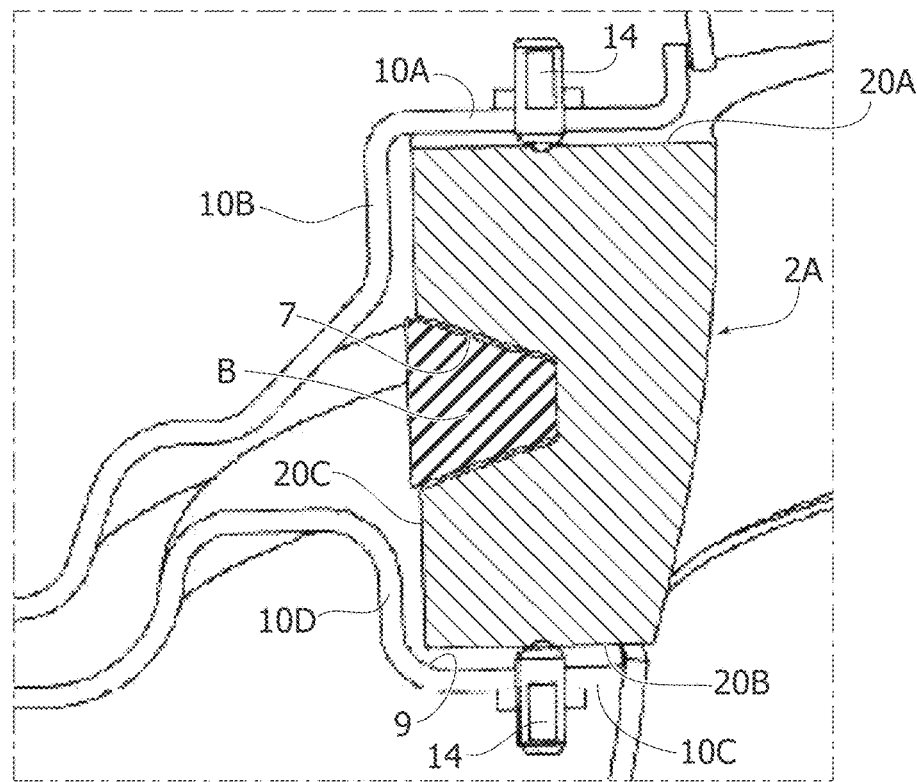

FIG. 19 illustrates an alternative solution, wherein the two circumferential series of devices 14 are arranged vertically, with their respective balls in contact with the upper and lower surfaces 20A, 20B of the rotor ring 2A.

Figure 1:
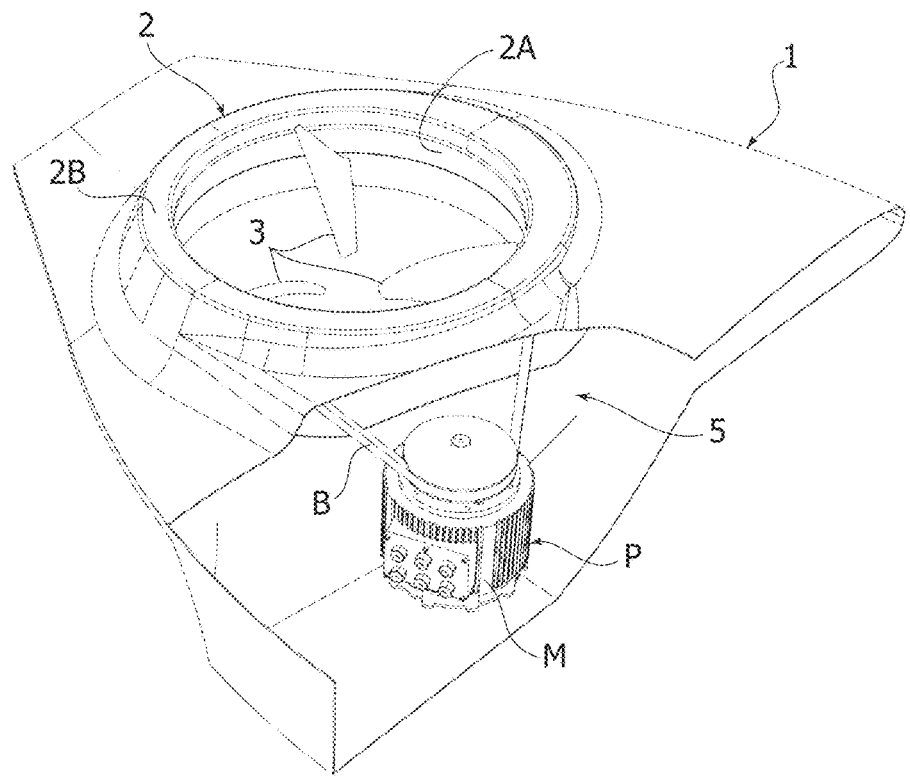
Figure 2:
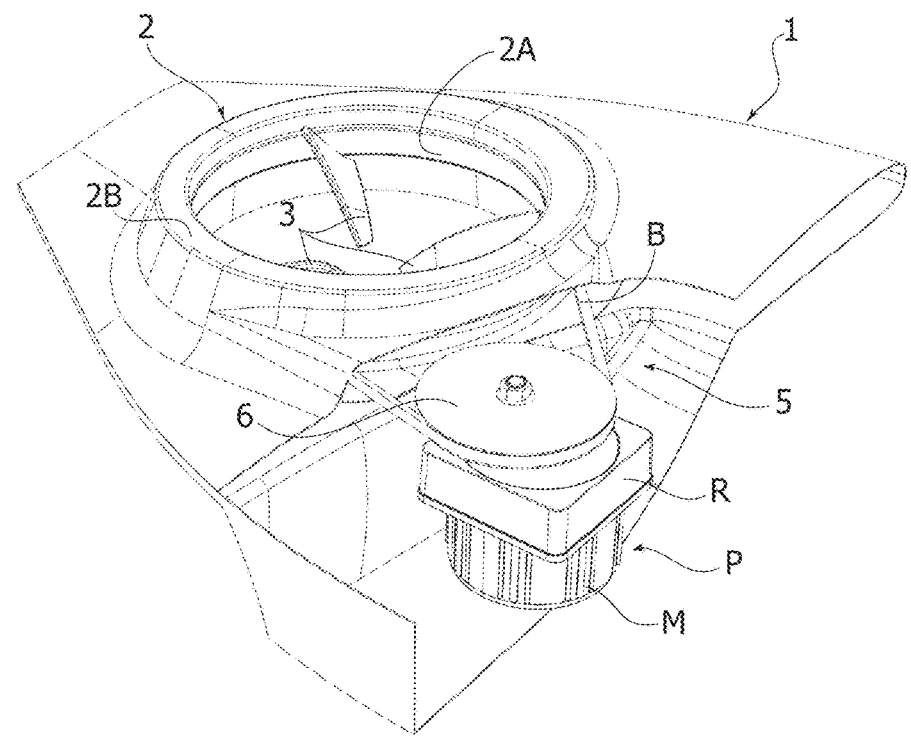
Figure 5:
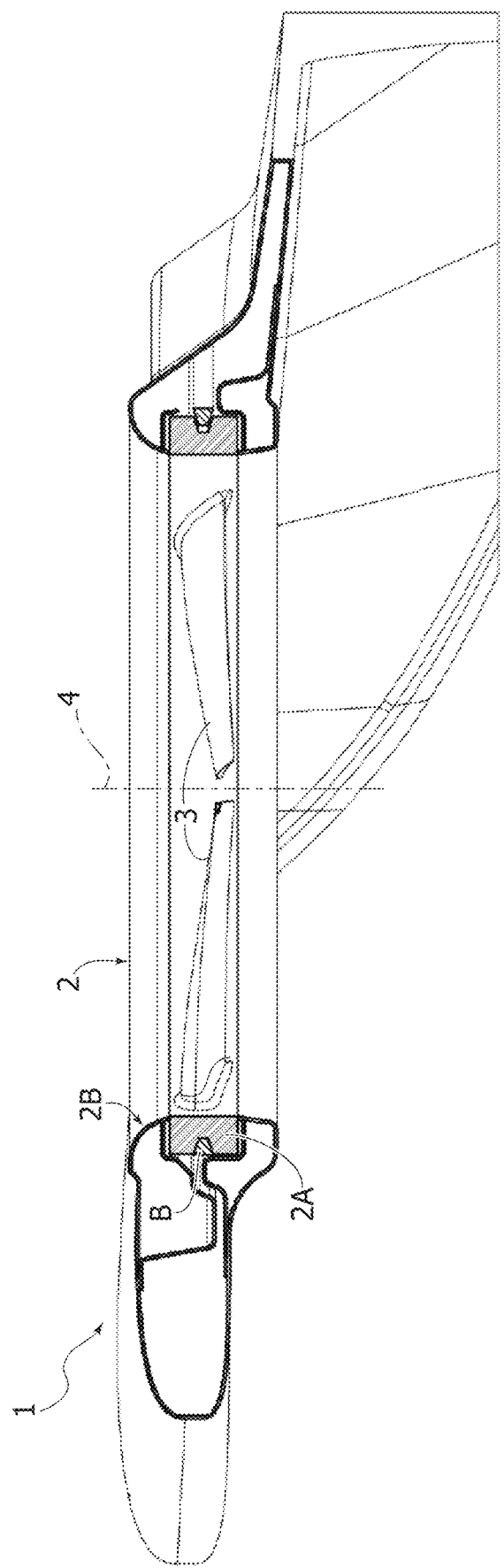
FIG. 5 illustrates the same cross-section as FIG. 3 in the case of a solution wherein the axial dimension H2 of the propeller guiding duct is reduced with respect to the axial dimension H1 of the propeller guiding duct in the case of the solution of FIG. 3.
Figure 20:
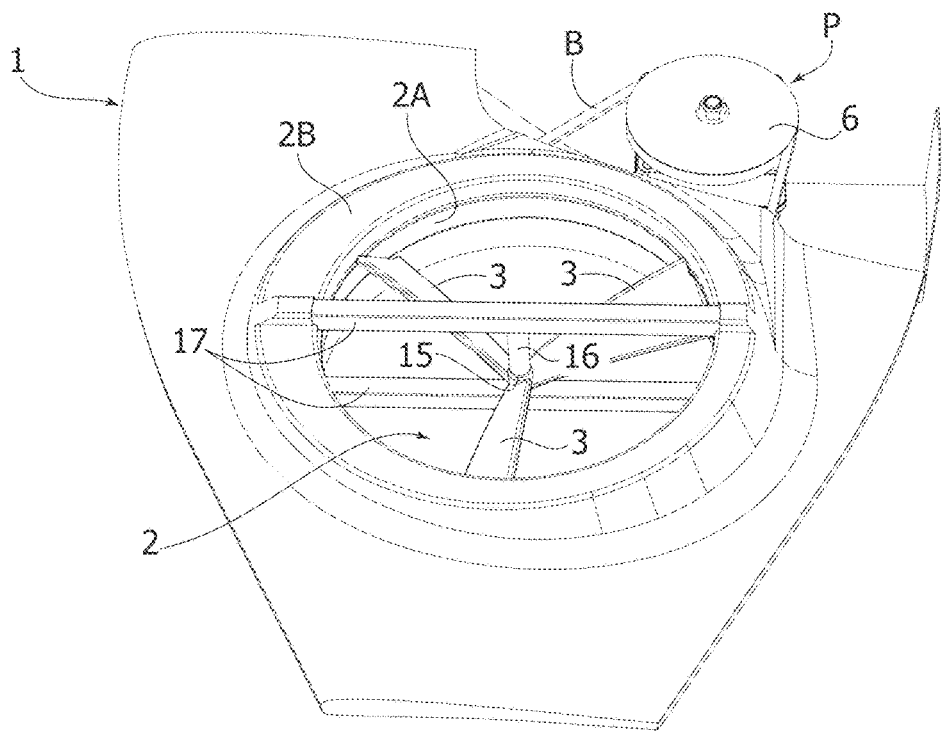

FIG. 20 is a variant of FIG. 2 showing an alternative solution wherein the variable pitch blades 3 join at their inner ends in a hub 15, which is rotatably mounted on a support pin 16. The support pin 16 is rigidly connected at its ends to two beams 17, which extend diametrically through the space inside the annular propeller, and which have their ends rigidly connected to the stationary structure of the wing 1.

Figure 21:
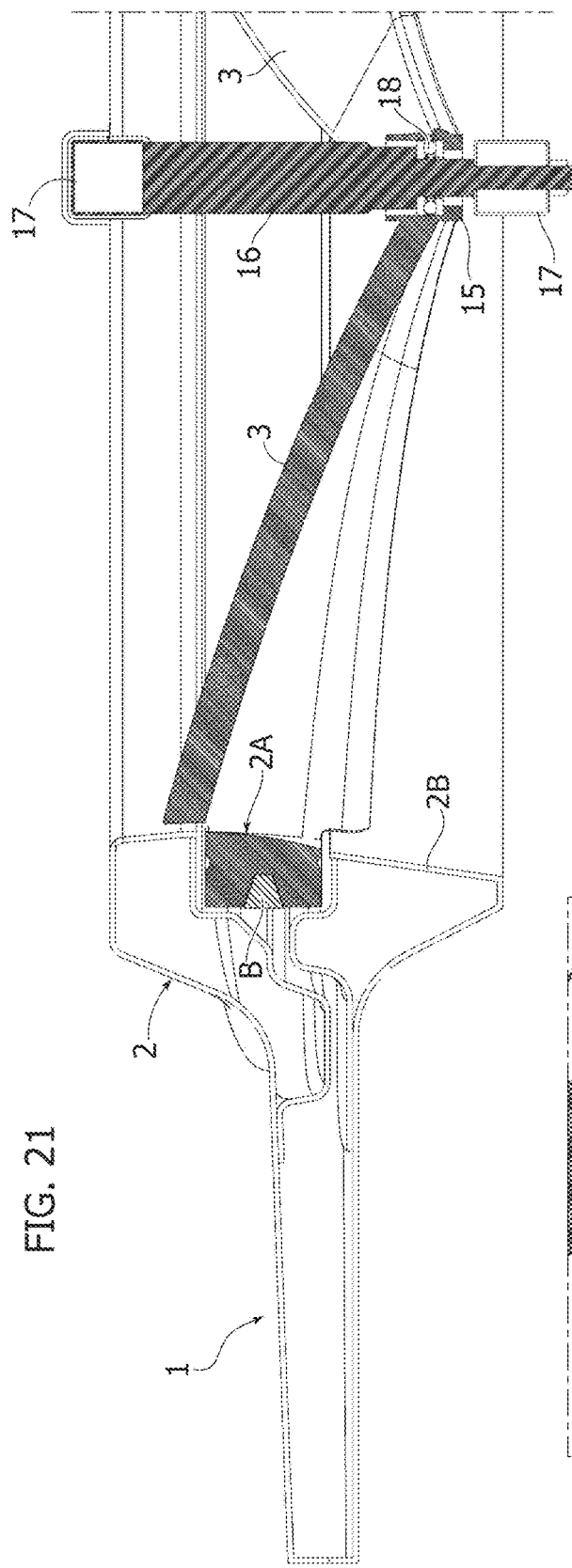
Figure 22:
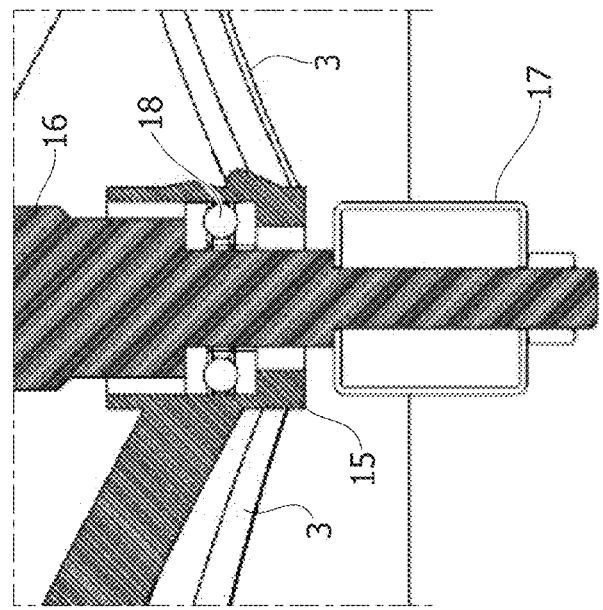

FIG. 21, and its detail illustrated in FIG. 22, refer to the case wherein the support pin 16 extends vertically between the two crossbars 17, and the hub 15 is mounted in rotation on the pin 16 by means of a single rolling bearing 18, adjacent to the crossbar 17 located below.

Figure 23:
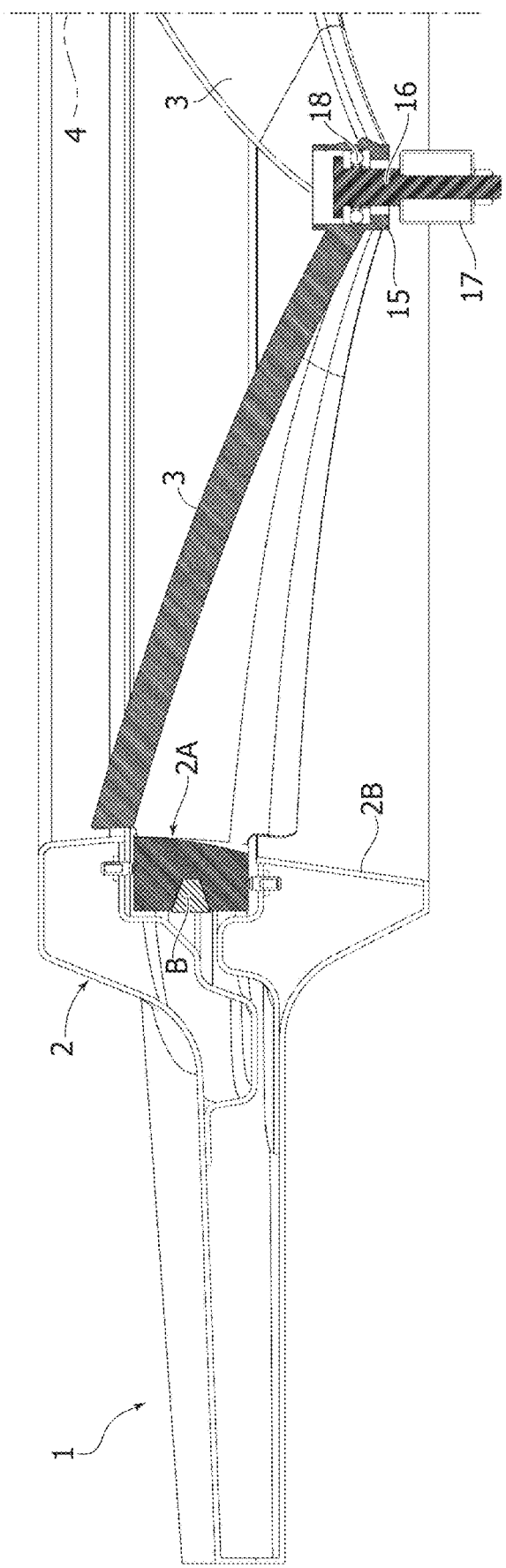

FIG. 23 illustrates a variant wherein the upper crossbar 17 is eliminated and the pin 16 has a reduced extension.

Figure 24:
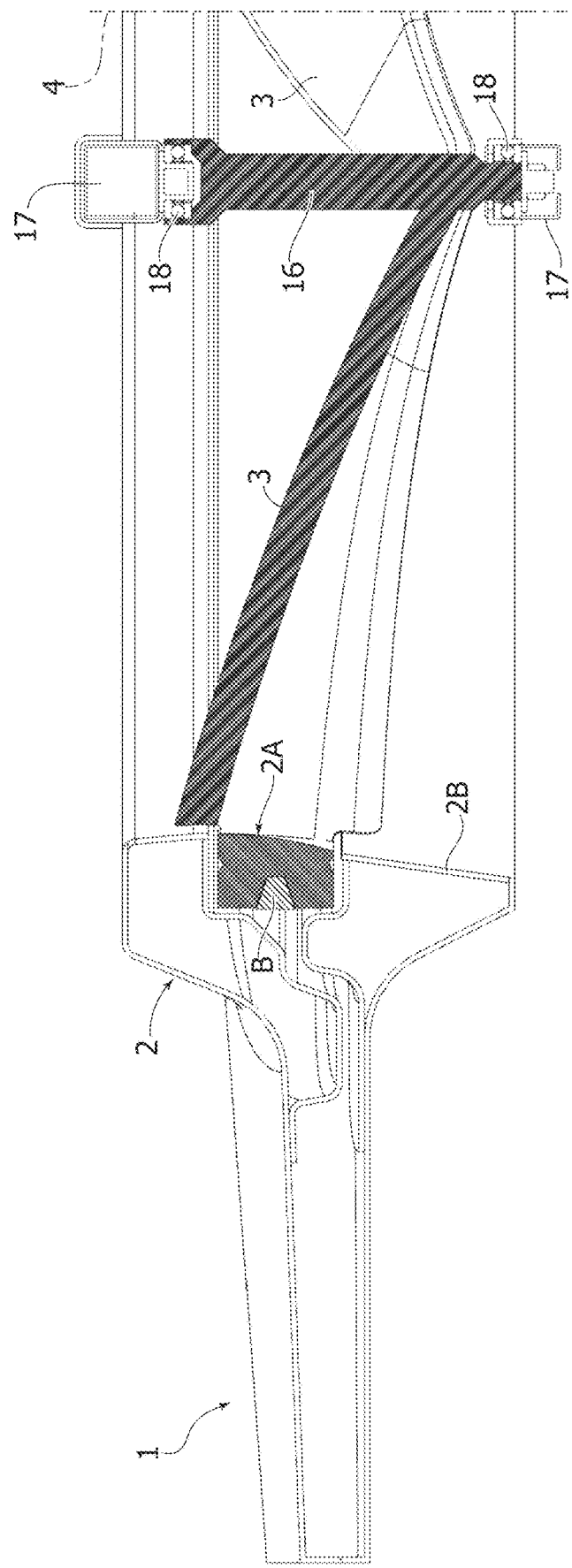

FIG. 24 illustrates another variant wherein the blades 3 are rigidly connected to the pin 16, which has its ends supported in rotation by the two cross-members 17 by respective rolling bearings 18.

Figure 25:
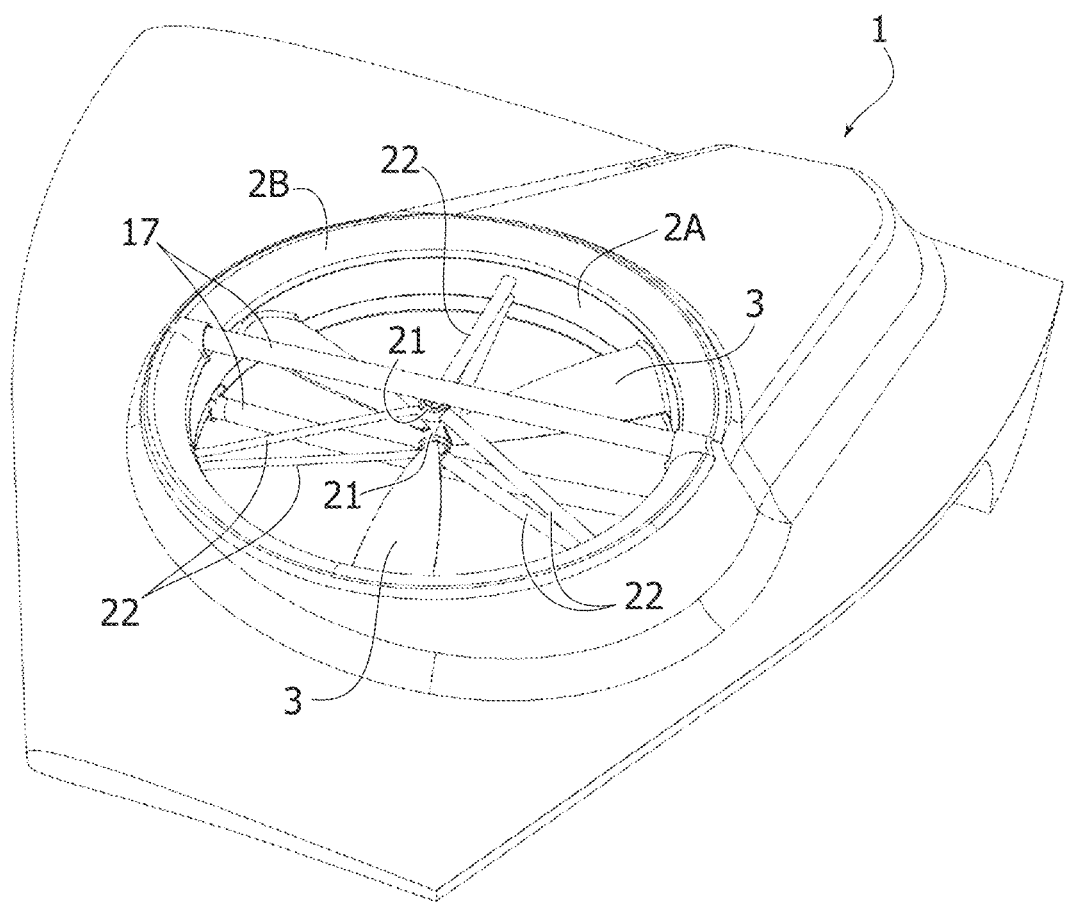

FIGS. 25-26 show another embodiment wherein the aforesaid support pin 16 has been eliminated. In this case, the supporting crossbars 17 are always provided. As can be seen more clearly in FIG. 27, each support bar 17 may have an elliptical shape to minimize the aerodynamic field disturbance (this characteristic is also applicable to the previously described embodiments). Each of the two bars 17 carries a pin 19, on which a hub 21 is rotatably mounted by means of a bearing 20. Each of the two hubs 21 is connected by means of a plurality of spokes 22 to the rotor ring 2A. As can be seen in FIG. 25, the spokes 22 associated with the upper hub 21 and the spokes 22 associated with the lower hub 21 are coupled two by two, in the same radial position and converge with each other in the direction of the rotor ring 2A.

Figure 28:
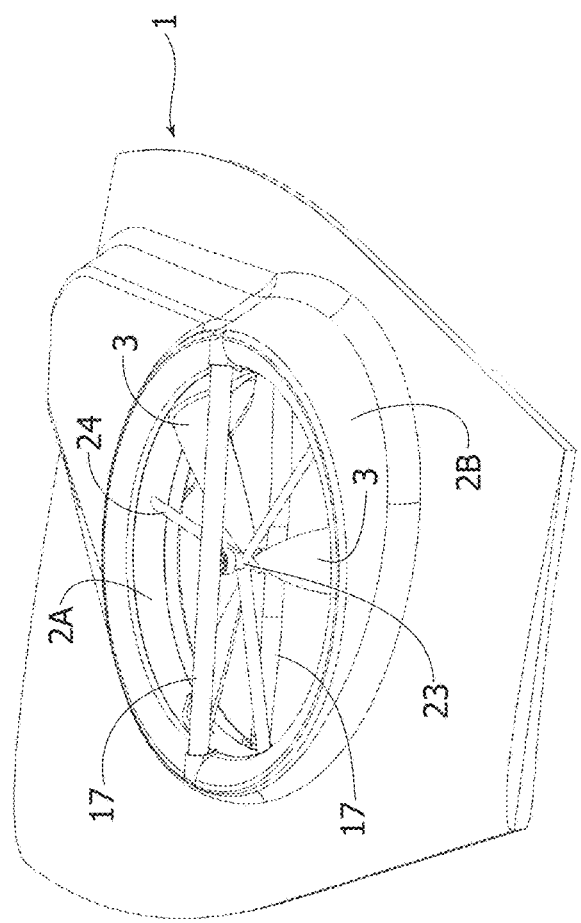
Figure 29:
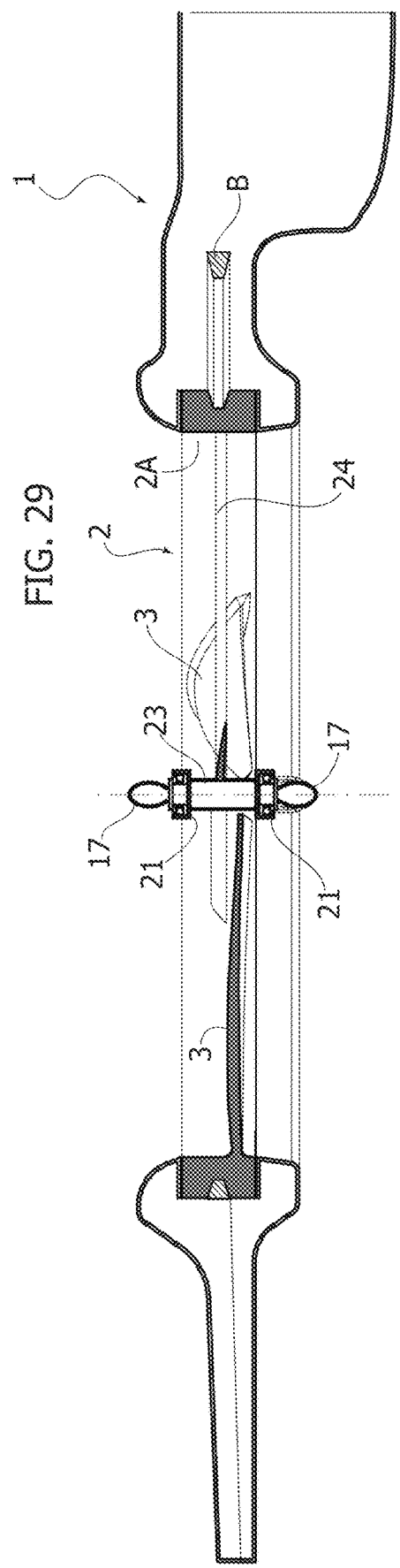

The embodiment of FIGS. 28, 29 differs from that of FIGS. 25-27, in that—in this case—the two hubs 21 are connected to each other by a central vertical pin 23 which is—in turn—connected to the rotor ring 2A by spokes 24. The blades with variable pitch in the representation of FIGS. 28-29 are free to vary their angle of attack with respect to the rotor ring 2A.

In the illustrated example, each annular propeller 2 has a crossbar 17 carrying a central pin on which a hub connected to the rotor ring 2A by means of spokes 22 is rotatably mounted. In this case, the blades 3 of each annular propeller may have their radially inner ends spaced apart from the central axis of the propeller.

Figure 30:
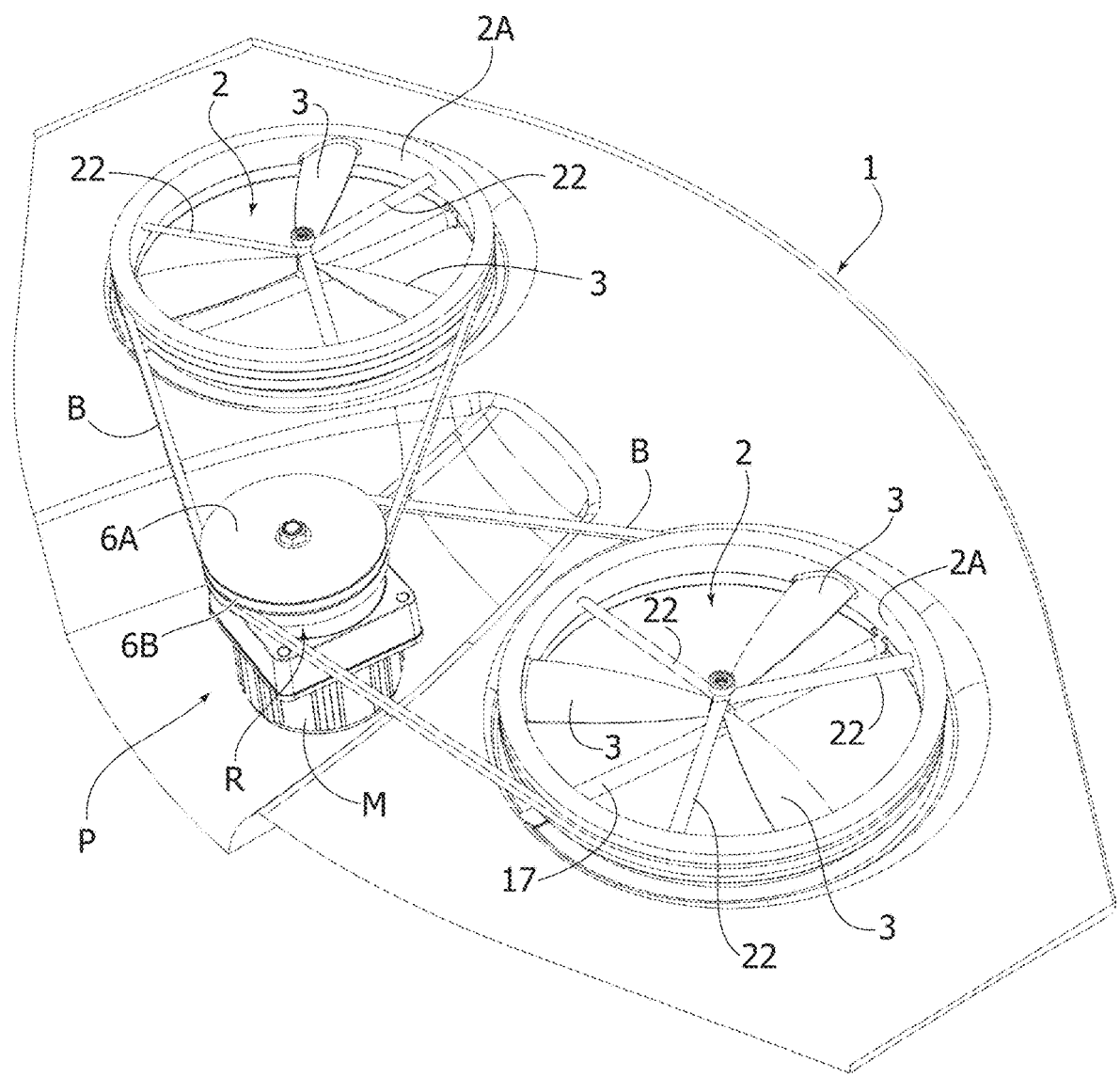

FIG. 30 shows another embodiment wherein two annular propellers 2 have their rotor rings 2A driven by a single motor unit T by means of two belts B gripped on two pulleys 6A, 6B, mounted in superimposed positions on the output shaft of the motor unit T.

Figure 31:
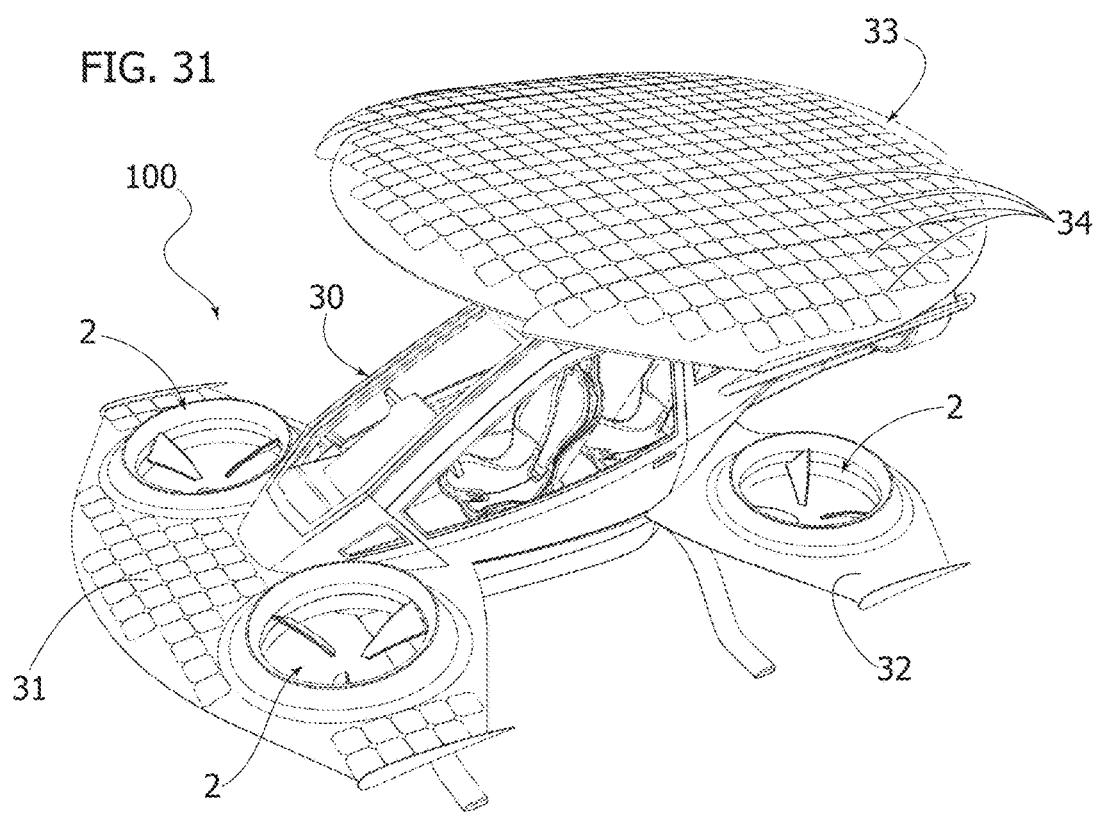
Figure 32:
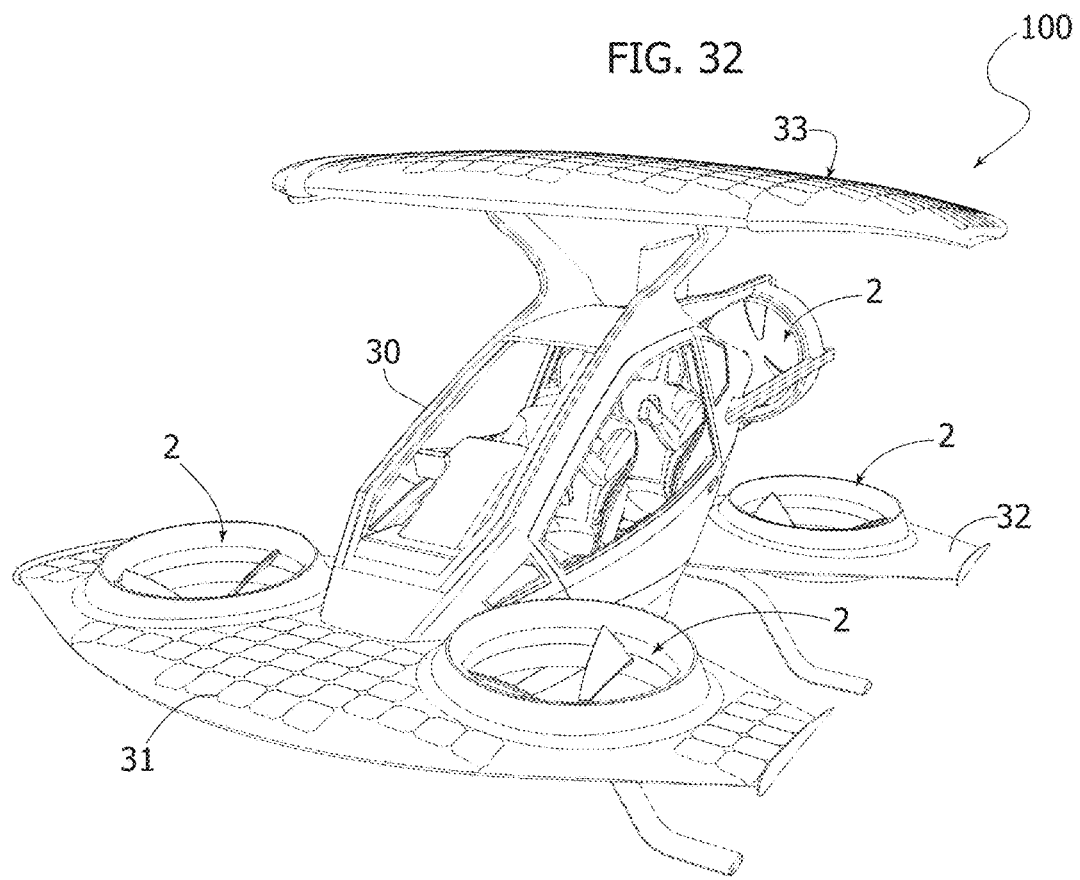

FIGS. 31, 32 show two perspective views of a first configuration of aircraft for personal air mobility aircraft, indicated overall with the reference number 100. The aircraft 100 has a passenger compartment 30 connected to a front wing 31 and to rear wings 32 in which four annular propellers 2 of any type described above are incorporated. The two annular propellers 2, arranged symmetrically at the two sides of the aircraft, are controlled in rotation in opposite directions by respective motor units, by means of respective belt transmissions (not shown), even if there is also the possibility of providing a motor unit to control multiple propellers via multiple belt transmissions. The aircraft has a tail with an annular propeller 2 with a vertical axis, also made in accordance with the present invention. The passenger compartment 30 is surmounted by a roof-wing 33 preferably discoidal in shape.

On both the lower and rear surfaces of the wings 31, 32, and on the roof-wing 33 a distribution of photovoltaic cells 34 is preferably provided, distributed by independent groups in order to reduce the impact of shading and the malfunction of one or more of the cells. The partition by groups of cells makes it possible to minimize the length of the array of cells so that the voltage of each group of cells is contained to values lower than 48V, typically between 6V and 48V. A panel containing a group of photovoltaic cells is composed of a flexible multilayer laminar structure. The photovoltaic cells are of the type consisting of monocrystalline silicon (for example, marketed by SUNPOWER Corporation) with an efficiency in the order of 25%, or of the multi-joint type, for example, GaAs, with typical efficiencies higher than 30%, or of the perovskite type or of the organic type. The photovoltaic panel has the back layer replaced by a thin carbon fiber composite. The first layers of the photovoltaic panel may be directly integrated into the aircraft structure and contribute to its rigidity.

Figure 33:
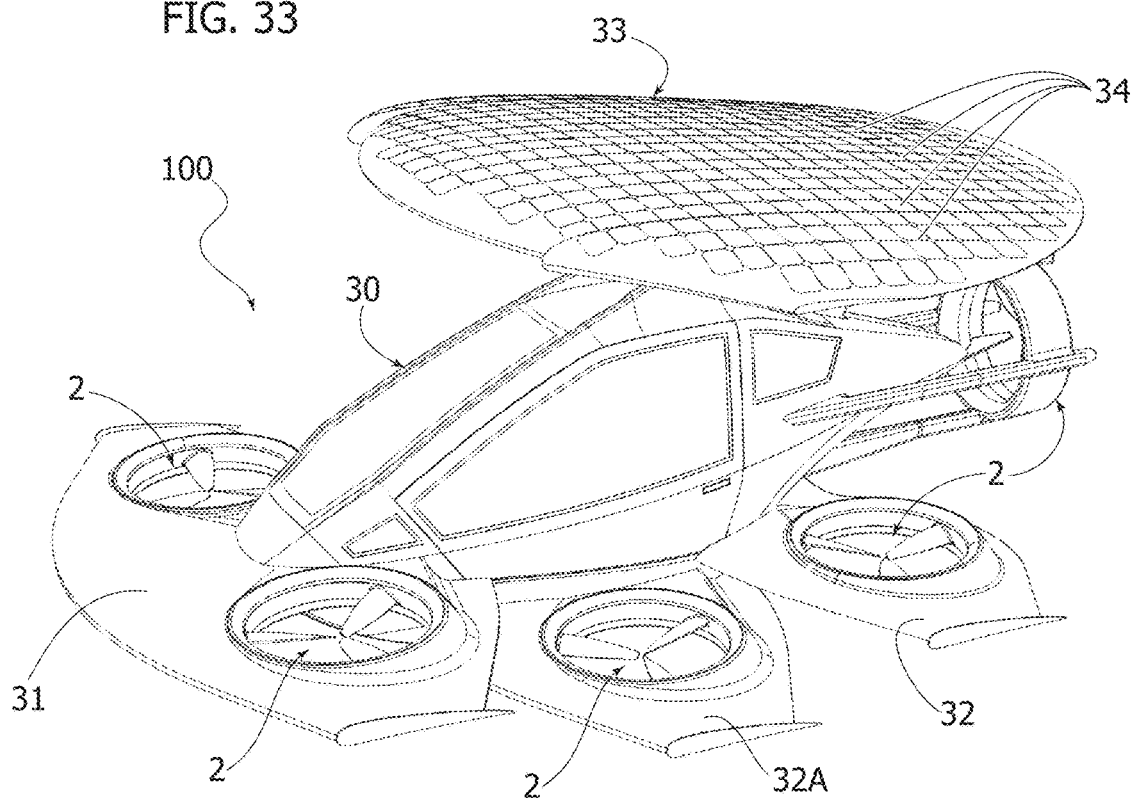

FIG. 33 shows a variant with six annular propellers 2 for vertical thrust arranged on six respective wing surfaces.

Figure 34:
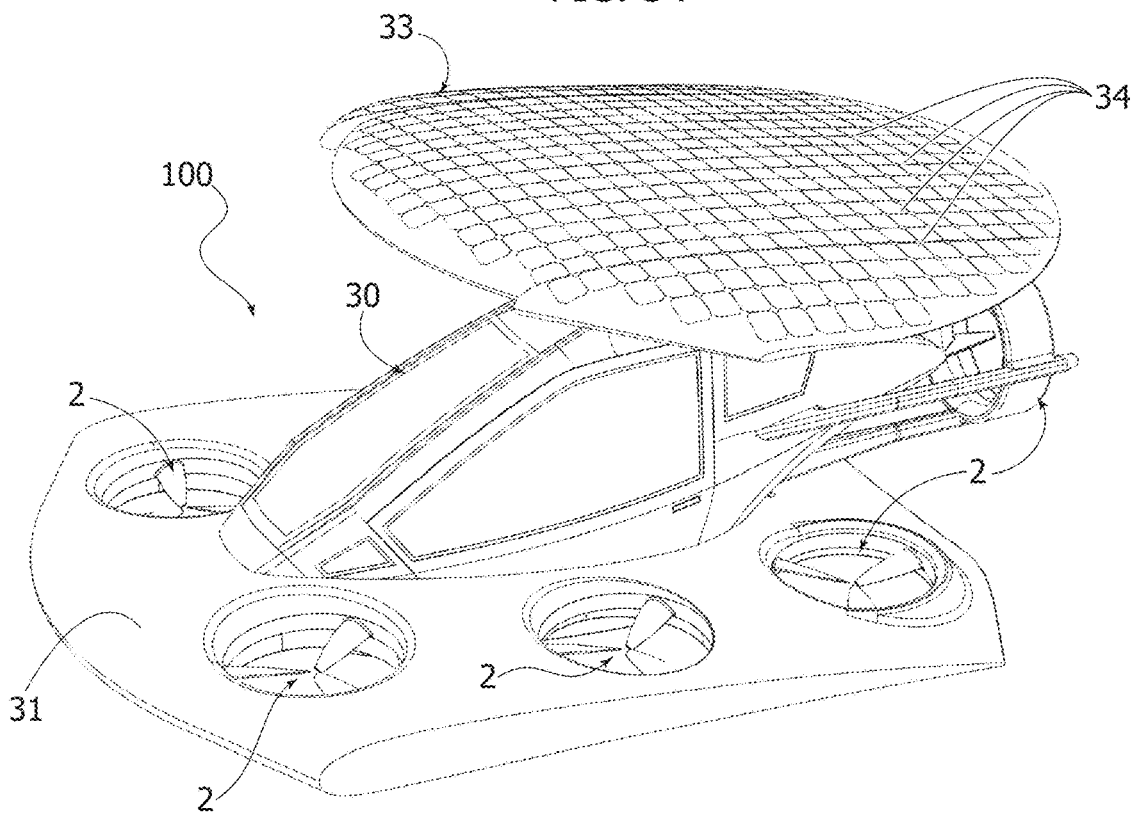

FIG. 34 shows the solution that still provides six annular propellers for vertical thrust arranged on a single wing surface 31. The horizontal thrust is obtained by means of a single annular propeller with a horizontal axis, as in the case of the embodiments described above.

Figure 35:
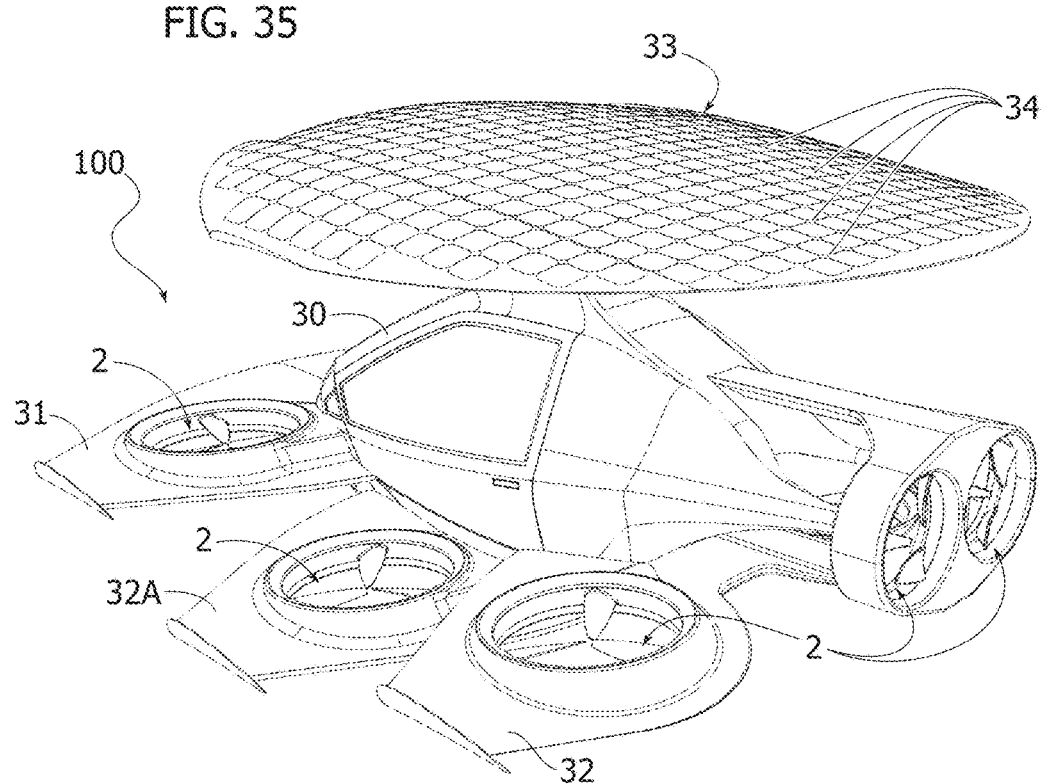
Figure 36:
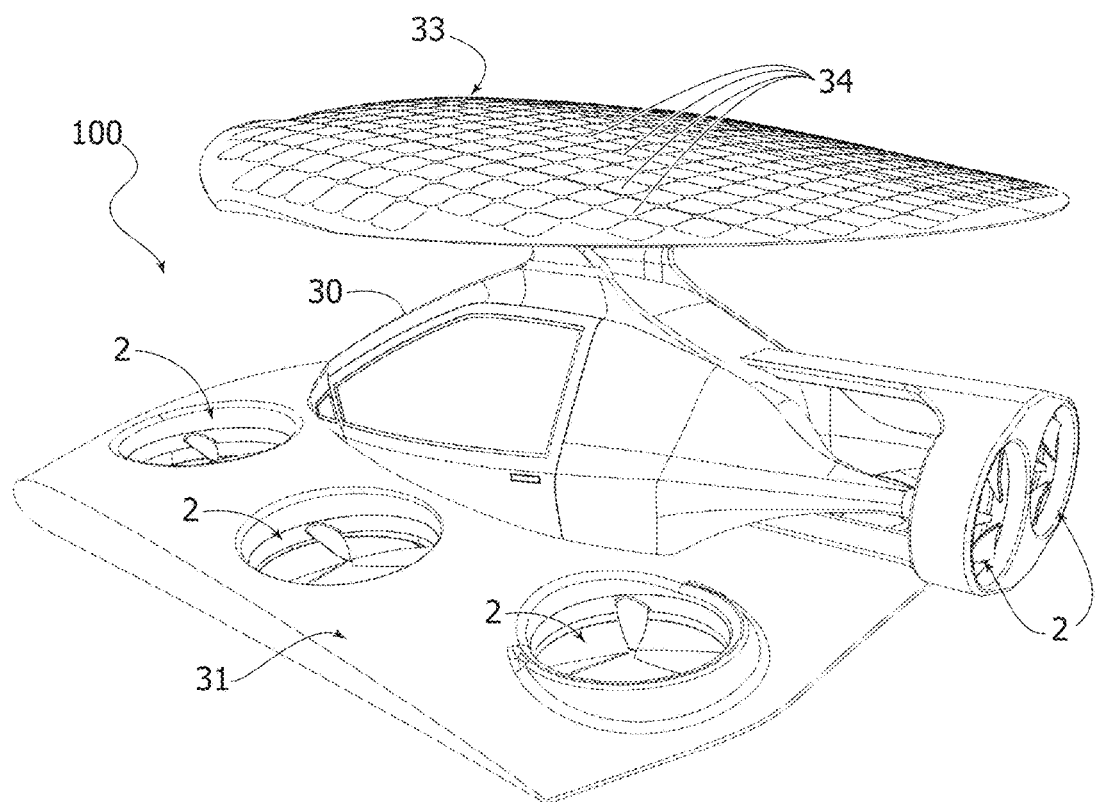

FIGS. 35, 36 show variants of FIGS. 33, 34, wherein two annular propellers 2 with horizontal axis are arranged at the tail of the aircraft, for horizontal thrust. Both in the case of a single tail rotor and in the case of two tail rotors, the shape of the passenger compartment is designed in such a way that the airflow remains adjacent to the surface of the passenger compartment due to the Coanda effect, until it is conveyed mainly towards the center of the rotors. In the case of two rotors, the tail of the passenger compartment divides in two to direct the flow.

Figure 37:
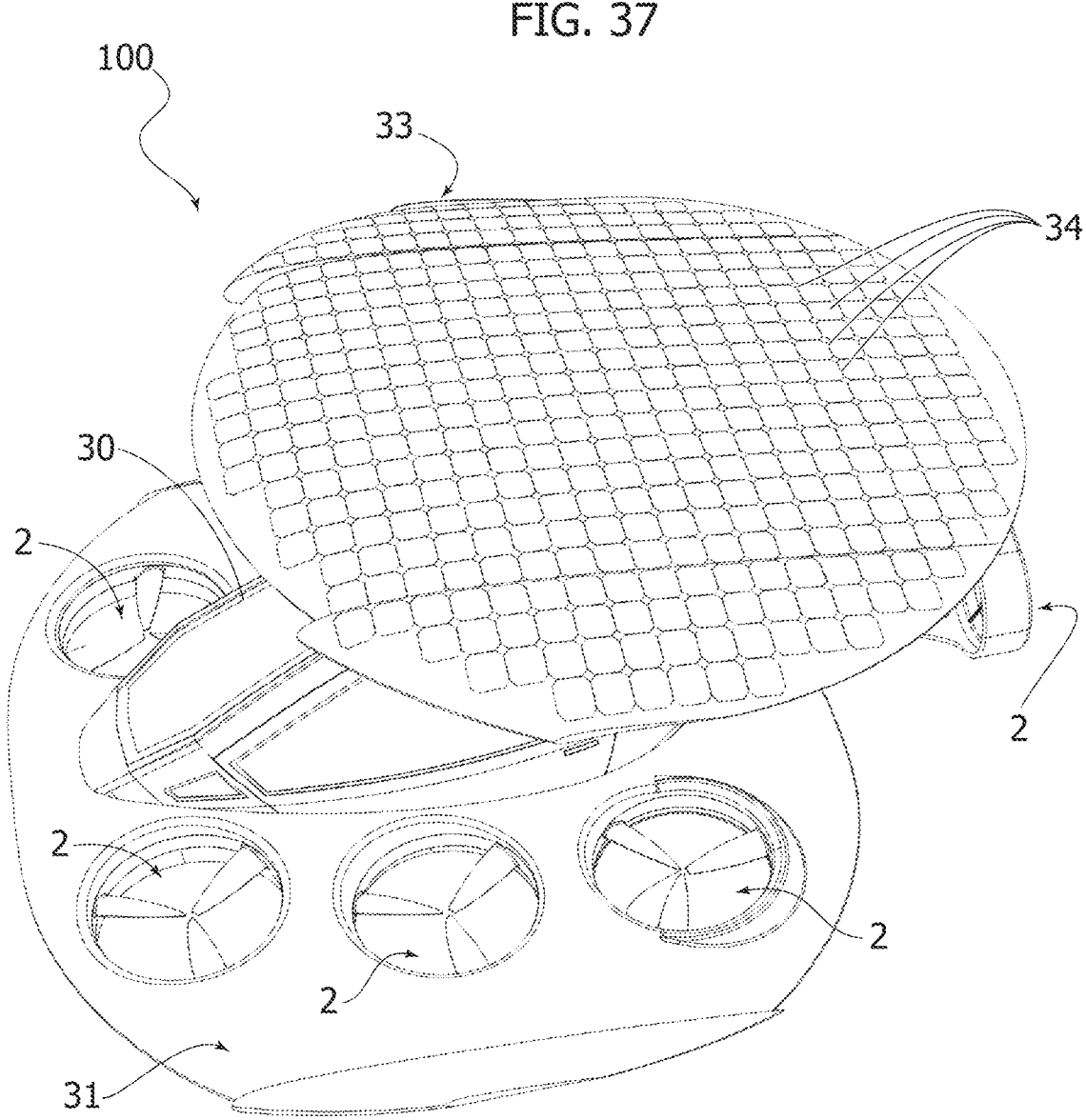

FIG. 37 shows a single-wing configuration, wherein a single lower wing 31 has a discoidal shape, similar to the discoidal shape of the roof-wing 33, preferably having a wider surface than the lower wing.

Figure 38:
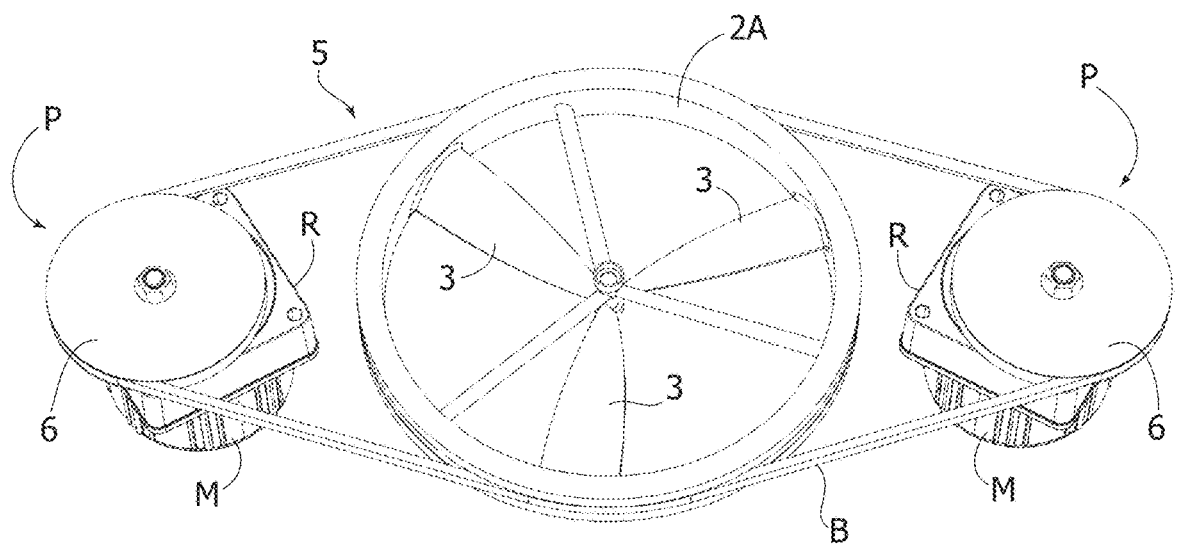

FIG. 38 is a perspective view of a variant wherein the same rotor ring 2A is driven by two propulsion units P arranged on opposite sides with respect to the rotor ring 2A. In the example, each propulsion unit comprises an electric motor M and a reducer R. The propulsion units P drive two pulleys 6, which drive the rotor ring 2A by means of the same belt transmission 5, including a closed loop belt B, which engages the two pulleys 6 and the rotor ring 2A. The two electric motors M may be of equal power or of different power, and operate independently, that is to say, thanks to the properties of the electric motors, the speeds and torques of the two motors M self-adapt and synchronize without the need for specific control.

Figure 39:
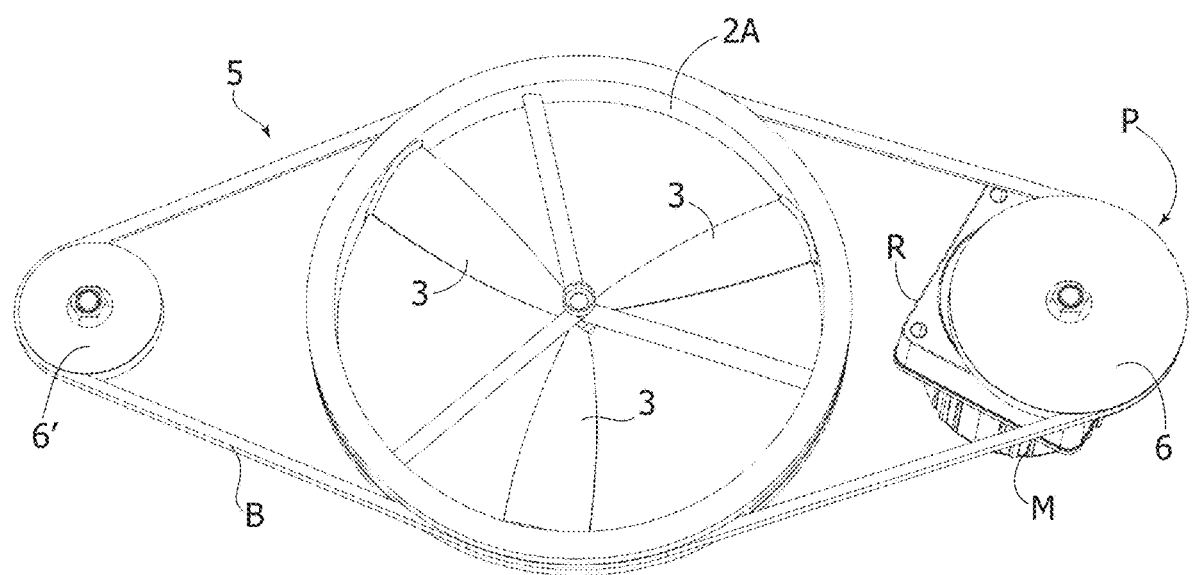

FIG. 39 is a perspective view of another variant wherein the rotor ring 2A is driven by a single electric motor M by means of a transmission belt B, which also engages an auxiliary pulley 6' located on the opposite side of the rotor ring 2A with respect to the electric motor M. The auxiliary pulley 6' is mounted freely rotatable, by means of a ball bearing, on a support element (not illustrated), which is pushed by a spring (not illustrated) in a direction that tends to keep the belt taut. In this way, the pin carrying the auxiliary pulley 6' by means of the respective bearing constitutes a belt-tensioning member, and also prevents translation of the rotor ring in the horizontal plane.

Both in the case of FIG. 38 and in the case of FIG. 39, the aircraft structure incorporates a substantially oval-shaped casing, which incorporates the annular propeller and the two electric motors (in the case of FIG. 38) or the annular propeller, the electric motor and auxiliary pulley (in the case of FIG. 39).

Figure 40:
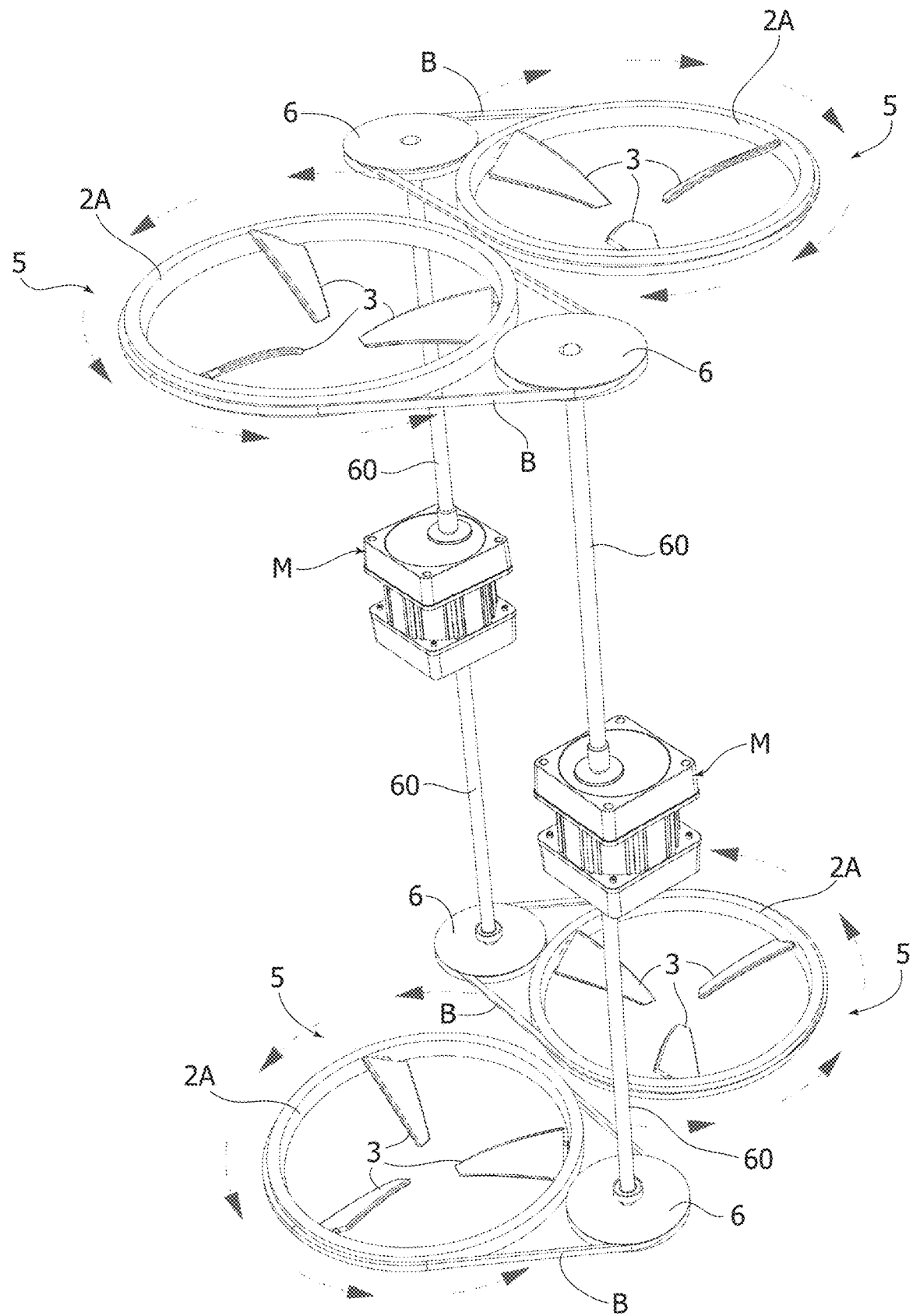

FIG. 40 is another variant of the drive system of the annular propellers of the aircraft of the invention, useful, for example, for the aircraft configuration, which will be described below with reference to FIGS. 44, 45.

In the example of FIG. 40, two electric motors M are designed to drive two pairs of rotor rings 2A axially spaced apart from the two electric motors M, above and below (with reference to the Figure) the two electric motors M.

The basic principle of this variant is also applicable to the case of a single rotor ring 2A driven by a single electric motor M. As illustrated, the pulley 6 that drives one rotor ring 2A is mounted at the end of a crankshaft 60 which has a predetermined length, so as to achieve the required spacing between the electric motor M and the plane of the rotor ring 2A and of the pulley 6.

In the example shown, each electric motor M has two crankshafts 60 extending from opposite sides of the electric motor (if necessary through a respective reducer) to drive respective pulleys 6 spaced above and below the electric motor. As already indicated, in this example, two electric motors are provided to drive two pairs of rotor rings 2A.

Figure 41:
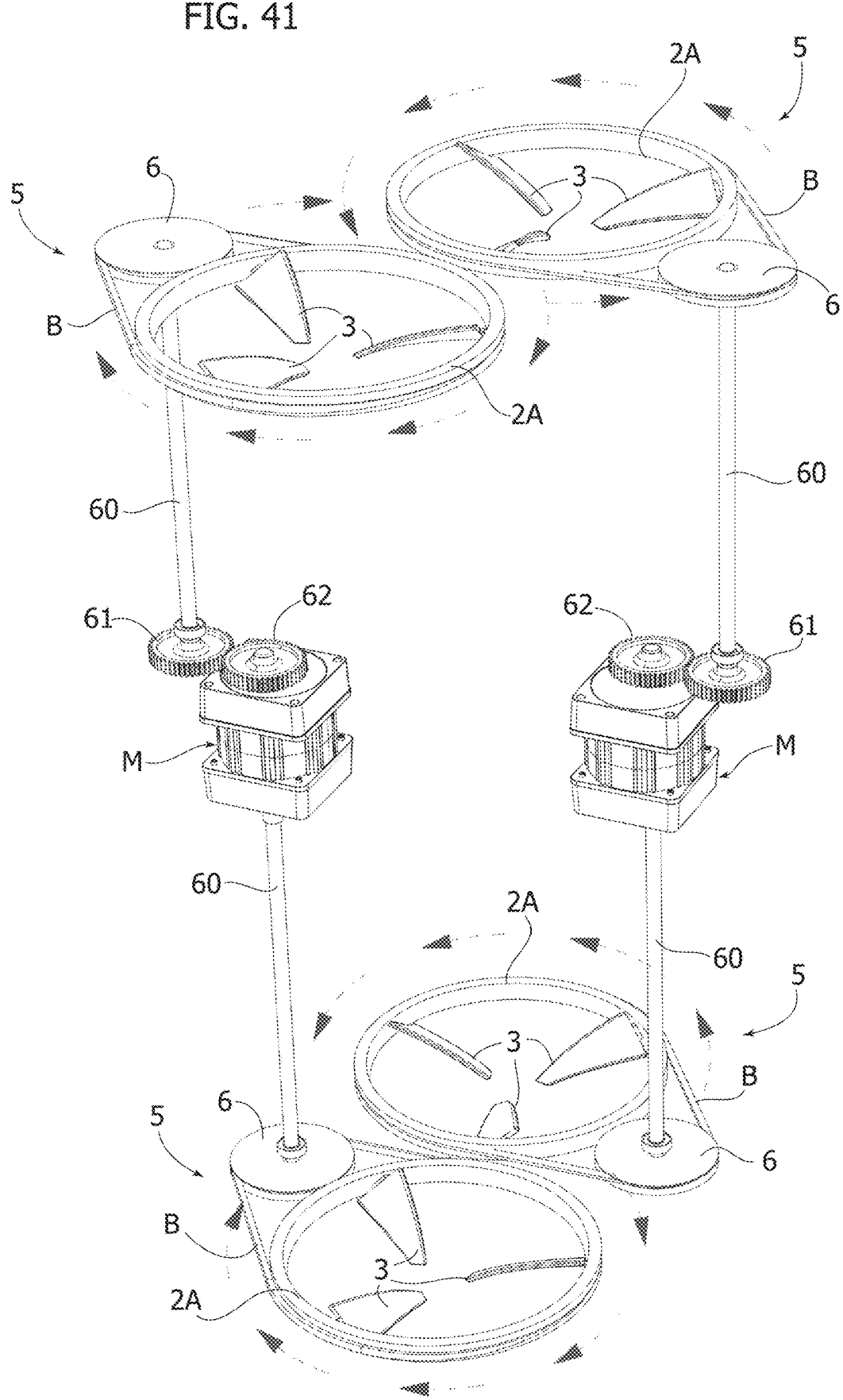

FIG. 41 illustrates a variant of the solution of FIG. 40, wherein each electric motor M rotates the two rotor rings connected thereto in opposite directions, thanks to a gear transmission (in the example a pair of gears 61, 62), which reverses the direction of rotation. In this way, in the example of FIG. 41, the two electric motors M drive the two upper rotor rings in one direction and the two lower rotor rings in the opposite direction.

Figure 42:
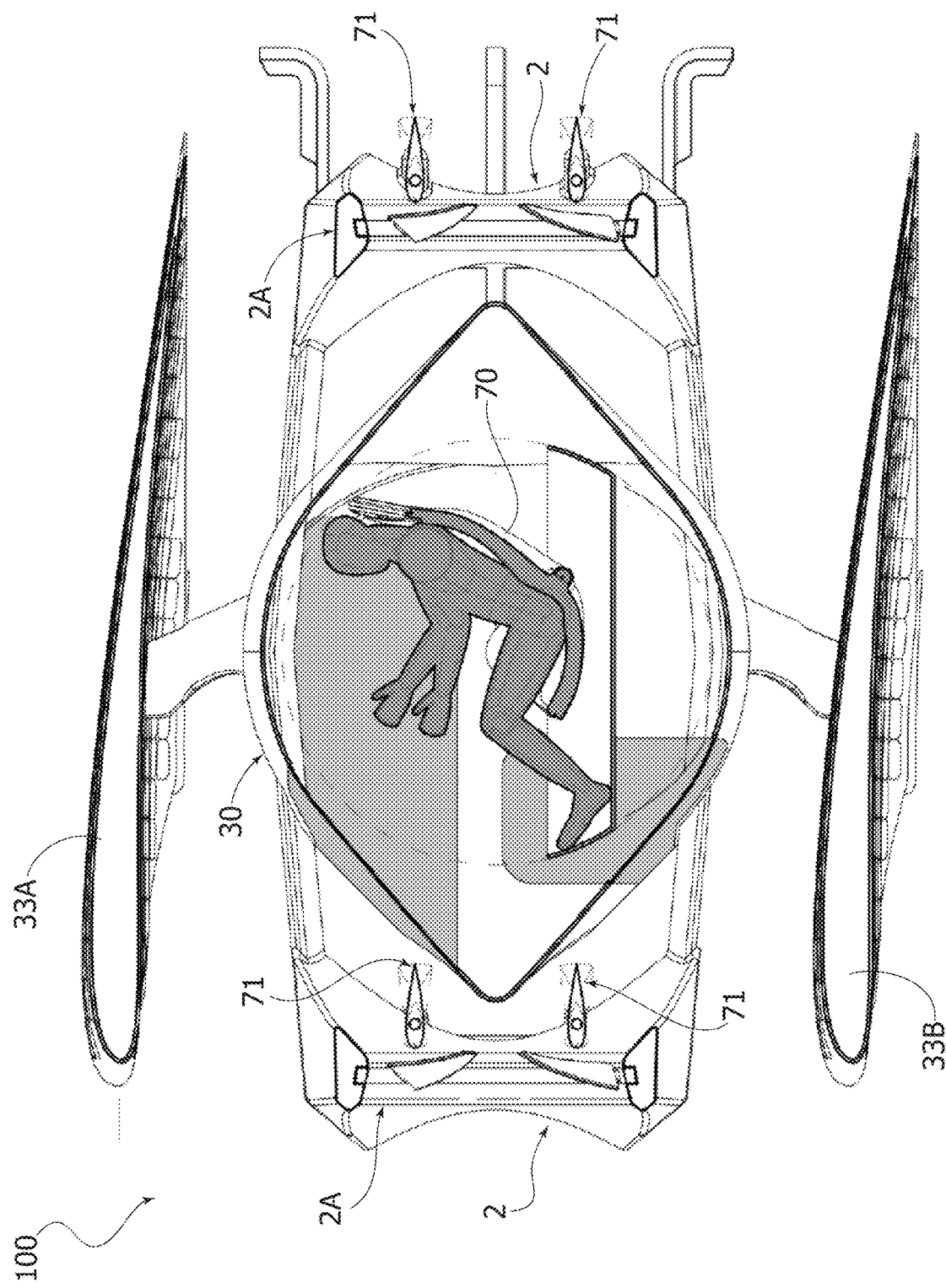
Figure 43:
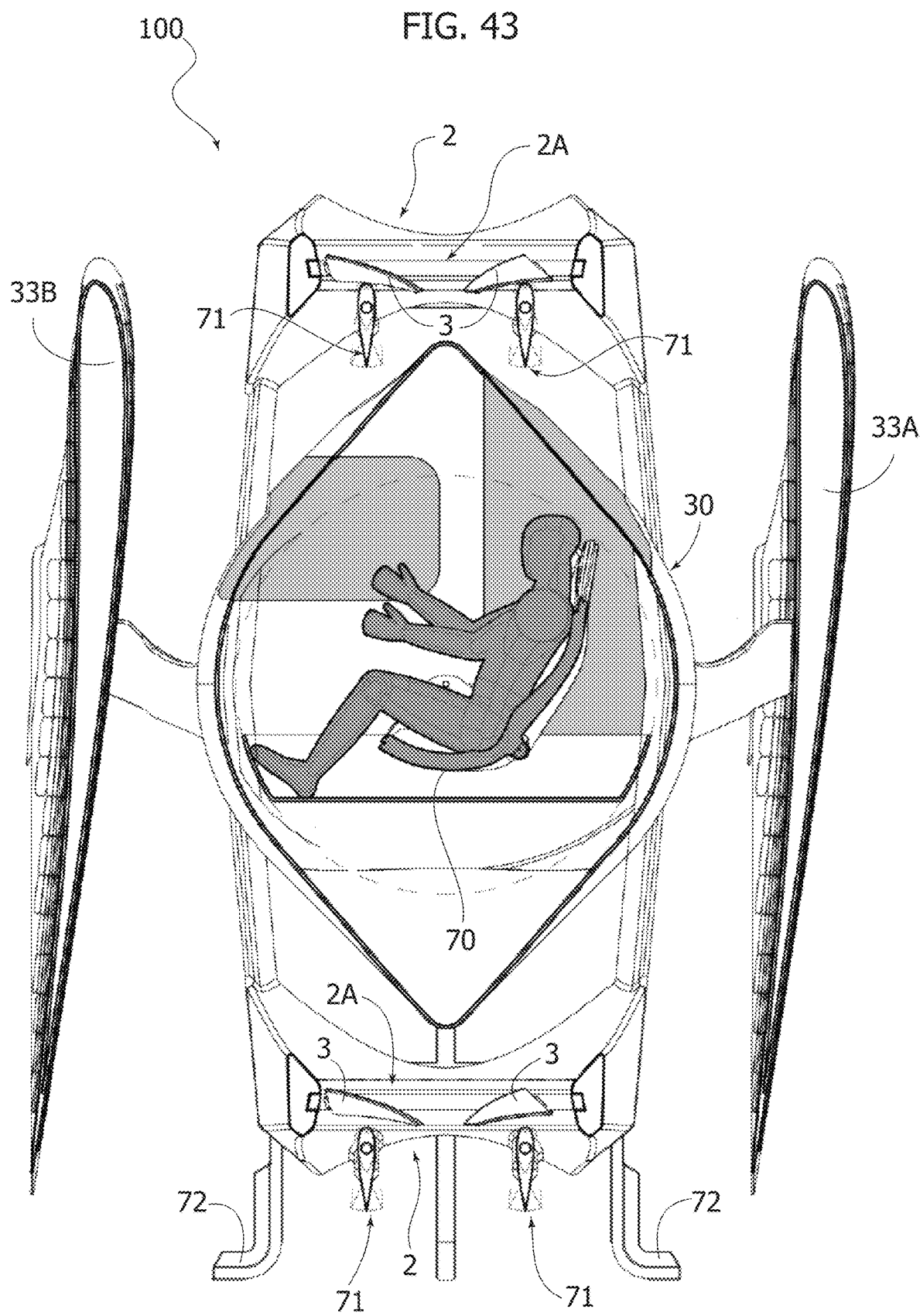

FIGS. 42 and 43 show another embodiment of the aircraft according to the invention, respectively, in the flight attitude and in the take-off and landing attitude. In these Figures, the parts common or corresponding to those of FIGS. 31-37 are indicated by the same reference numbers. In this case, the aircraft has a passenger compartment 30 wherein the pilot and any passengers are each seated on a seat 70 supported with an entire interior cabin in a pivoting manner, and controlled by an actuator device using gravity and an inertial platform to automatically maintain the same attitude of the occupants when the aircraft attitude varies between the vertical attitude and the horizontal attitude.

In this case there are two annular propellers 2, one front and one rear, placed on the same longitudinal axis (which is vertically oriented in the take-off and landing attitude (FIG. 43)). The structural body 30 that contains the cabin has the shape of an ovaloid configured to favor and guide the airflow from one propeller to another. The cabin-passenger compartment, which contains the seats 70 and the driving control panel, rotates with respect to the ovaloid structural body by pivoting on reinforcing elements placed on the same ovaloid body.

Directional flaps 71 are associated with each annular propeller (for example, two pairs of flaps oriented orthogonally to each other), which may also have the function of support feet. In the example of FIGS. 42, 43, support feet 72 are provided, distinct from flaps 71, which are operational when the aircraft is on the ground, in the attitude of FIG. 43. In the parking phase, the rotors may also be kept on a horizontal plane and—in this case—the flaps are used so that the aircraft rises on one side until the rotors are arranged on a vertical axis and then begin the ascent. Preferably, two wings 33A, 33B are provided, always preferably of discoidal shape, spaced apart above and below the oval body of the passenger compartment 30 (with reference to the horizontal flight attitude shown in FIG. 42). This configuration is made possible in that the aircraft lands and takes off in the vertical attitude of FIG. 43. In flight, the aircraft has a biplane-type configuration. The two wings may differ in area and width (wingspan). In addition to the disc-shaped wings, the wings may be of a classic shape, usually used in biplanes, for example, straight wing with constant chord and zero arrow angle, or straight wing with reduced arrow angle and variable chord, or trapezoidal wing with strong arrow angle and variable chord. However, it is also possible to provide a single wing. The profile of the wings is chosen based on the maximum design speed.

Once taken off in the attitude of FIG. 43, the aircraft gradually moves into the attitude of FIG. 42, by controlling the direction of the jet of the rotors by means of the flaps associated therewith.

Figure 44:
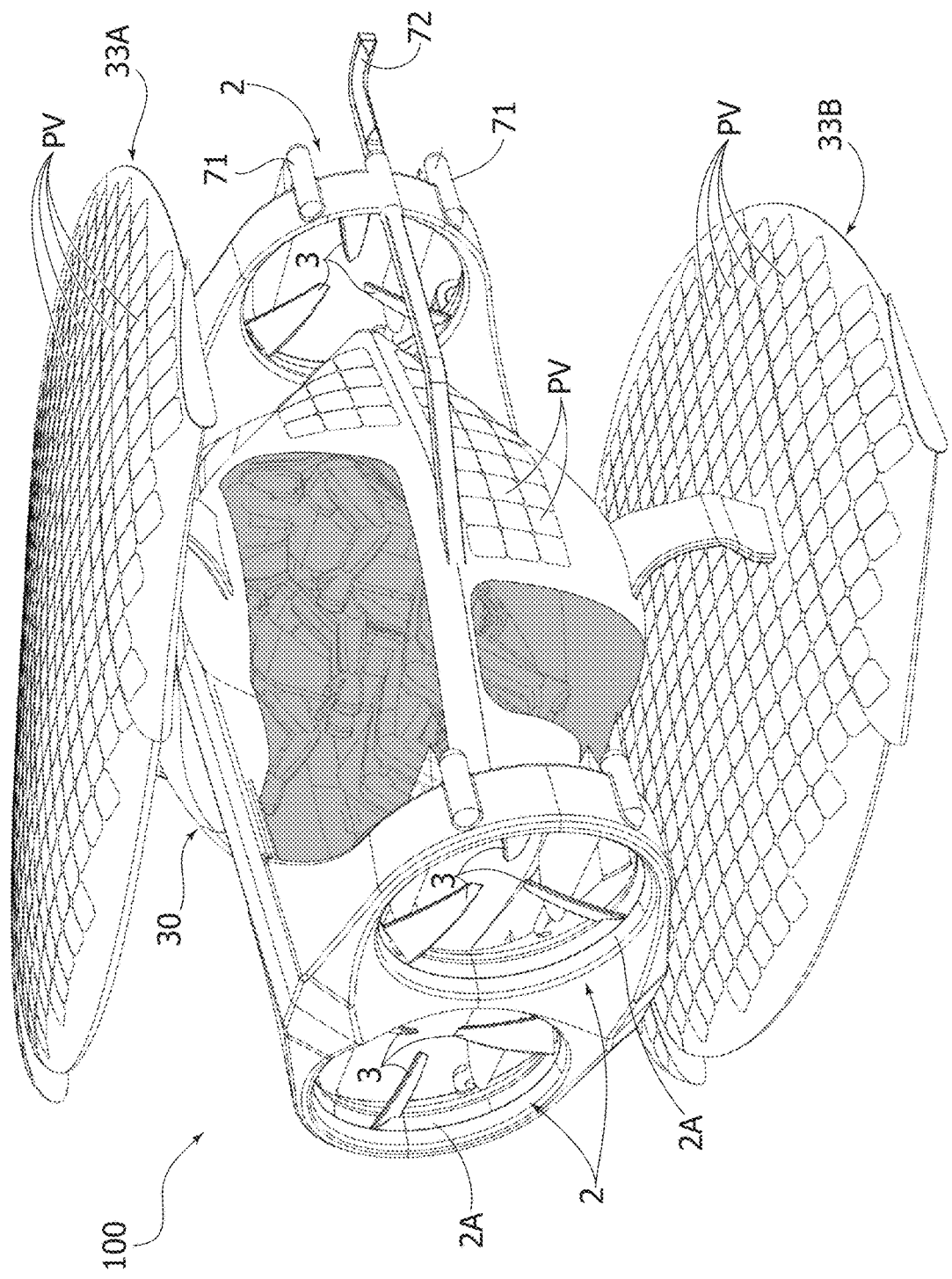

FIG. 44 shows a perspective view of an aircraft configuration with two front rotors 2 and two tail rotors 2, an upper wing 33A and a lower wing 33B with integrated groups of photovoltaic cells PV on both the upper and lower surfaces of each wing. The ovaloid structure is configured in such a way as to favor the directing of airflows between the rotors.

Figure 45:
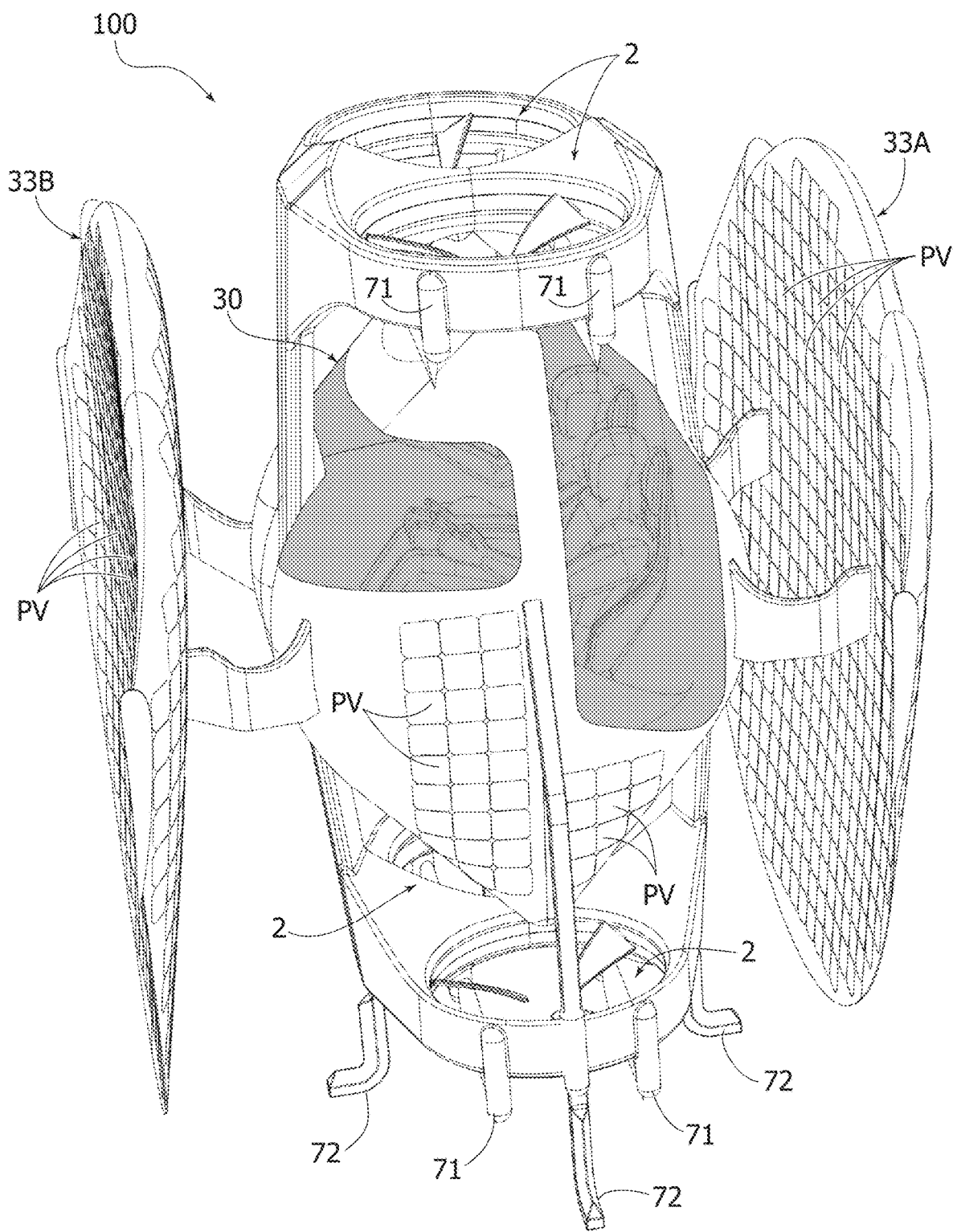

FIG. 45 is a view of the aircraft of FIG. 44 in take-off and landing attitude.

As can be understood, the configuration of the propulsion system of FIG. 40 or of FIG. 41 can be adopted and useful, for example, for an aircraft of the type illustrated in FIGS. 44, 45. In the case of the aircraft of FIGS. 42, 43, it is possible to adopt a propulsion system with a single electric motor equipped with two shafts extending on opposite sides to drive the pulleys 6 that drive the two rotors. Of course, the representations of FIGS. 42, 43 and 44, 45 are purely schematic. For greater simplicity of illustration, these Figures do not show the drive transmissions of the rotors, which can be made in accordance with the basic principle of the solutions of FIGS. 40 and 41, and which can be contained within two housings (not shown), arranged at the two sides of the passenger compartment body 30.

For the same reason, these schematic Figures do not show the door, with an associated ladder, arranged in the body of the passenger compartment 30, for access to the passenger compartment.

With reference to the configuration of FIG. 43, the typical dimensions are:
height H: 270-300 cm;
width W: 160-200 cm;
length L in the case of a discoid wing: 250-300 cm;
length L in the case of a conventional wing: 500-700 cm.

The aircraft of the invention comprises independent groups of photovoltaic cells for recharging a main battery pack 201, for powering the electric motors of the aircraft, at low or medium voltages (for example, 48-120 V) up to higher voltages (usual in the automotive world) up to 800V, and possibly also an auxiliary electric battery 202, at relatively low voltage (for example 12V), for powering the on-board electrical circuit.

Figure 46:
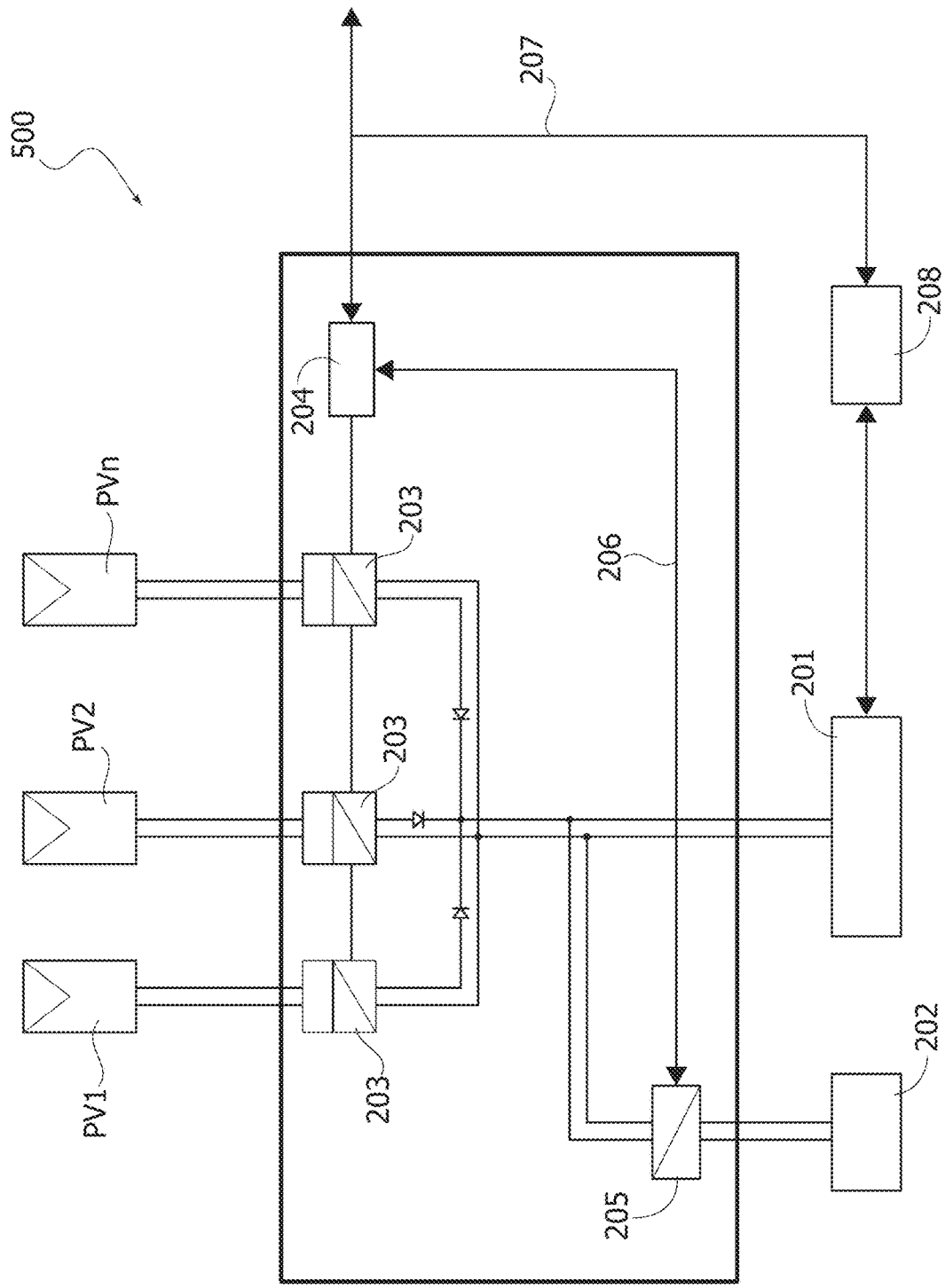
Figure 47:
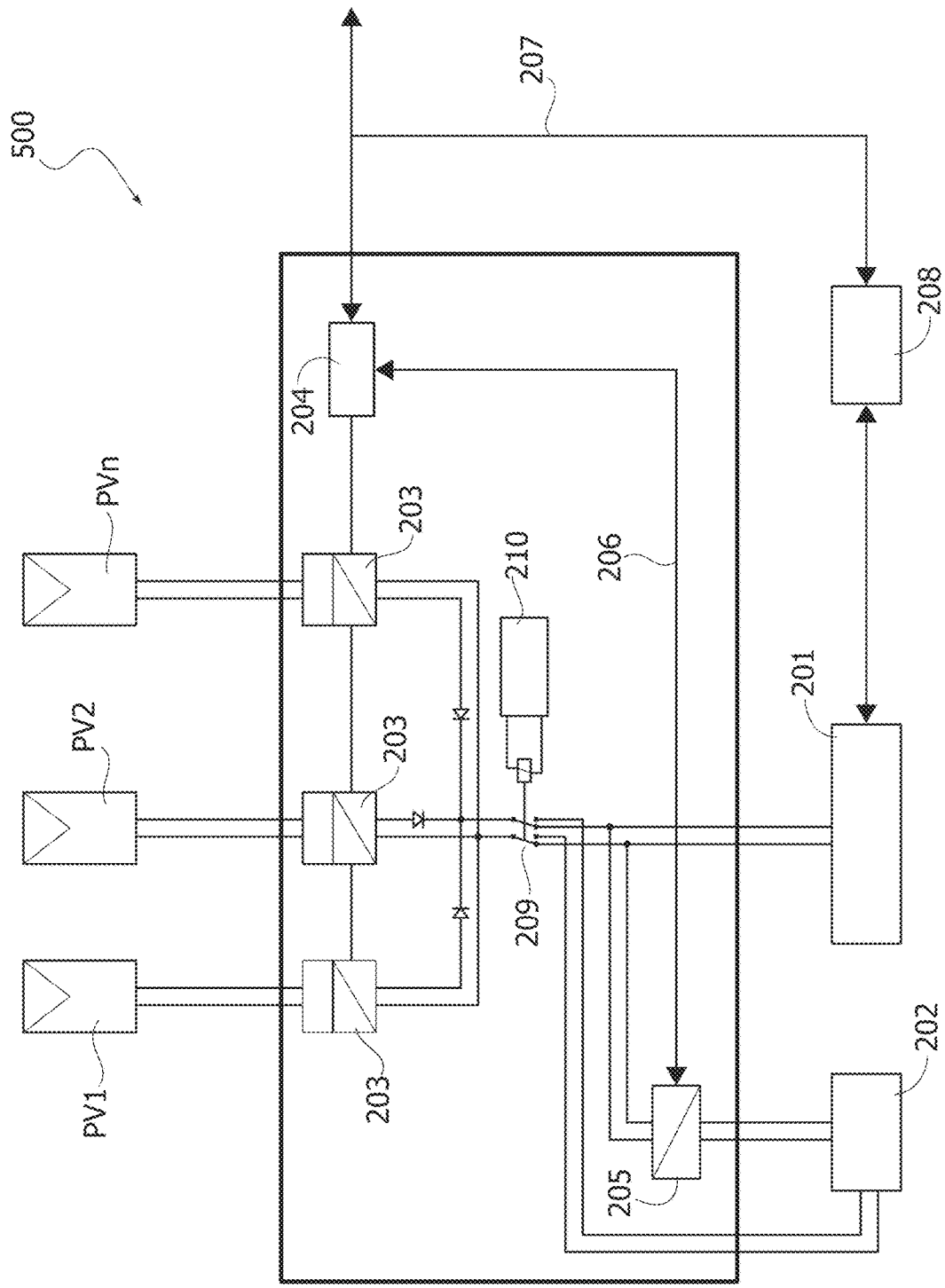

FIG. 46 and FIG. 47 illustrate two alternative schemes of the charging management system 500.

A group of photovoltaic cells PV1, PV2, . . . , PVn is connected to the main battery pack 201 or to a lower voltage portion thereof by means of DC-DC converters 203 controlled in a synchronized way by an electronic board 204 in order to power the pack battery 201 with charging current at the operating voltage of the battery pack 201 or in order to reduce the multiplication factor of the converter connected to a portion of the battery pack of lower voltage.

Another DC-DC converter 205 supplies current to the auxiliary battery 202 at the operating voltage of the auxiliary battery 202. The electronic card 204 is connected by means of BUS CAN 206 with the DC-DC converter 205, and by means of a BUS CAN line 207 with the battery pack management system 208 (BMS or Battery Management System). In the case of the diagram of FIG. 47, there is also a selector switch 209, controlled by an electronic board 210, to control the charging current supply to the battery pack 201 and to the auxiliary battery 202.

The groups of photovoltaic cells are positioned on the aircraft in such a way as to minimize the possibility of being in shaded areas. The system includes an electronic board to control the connection of the photovoltaic cell groups with the main battery at relatively high voltage, for powering the electric motors, and with an auxiliary electric battery, at relatively low voltage, for powering the electrical circuit onboard.

The aircraft according to the invention has a transverse dimension lower than the limit of 255 cm allowed for road vehicles, so that it can travel on the road and be parked in car parks.

Preferably, the electric batteries are distributed on the bottom and on the top of the cabin, with reference to the attitude in horizontal flight, to facilitate balancing the weights in forward movement. Alternatively, the batteries are placed on the bottom with the driver's position shifted towards the front rotor to keep the center of gravity midway between the two rotors in horizontal motion.

The photovoltaic solar cells are distributed over the entire wing surface (on both sides) and over the entire surface of the cabin, leaving transparent areas upwards and downwards.

Figure 48:
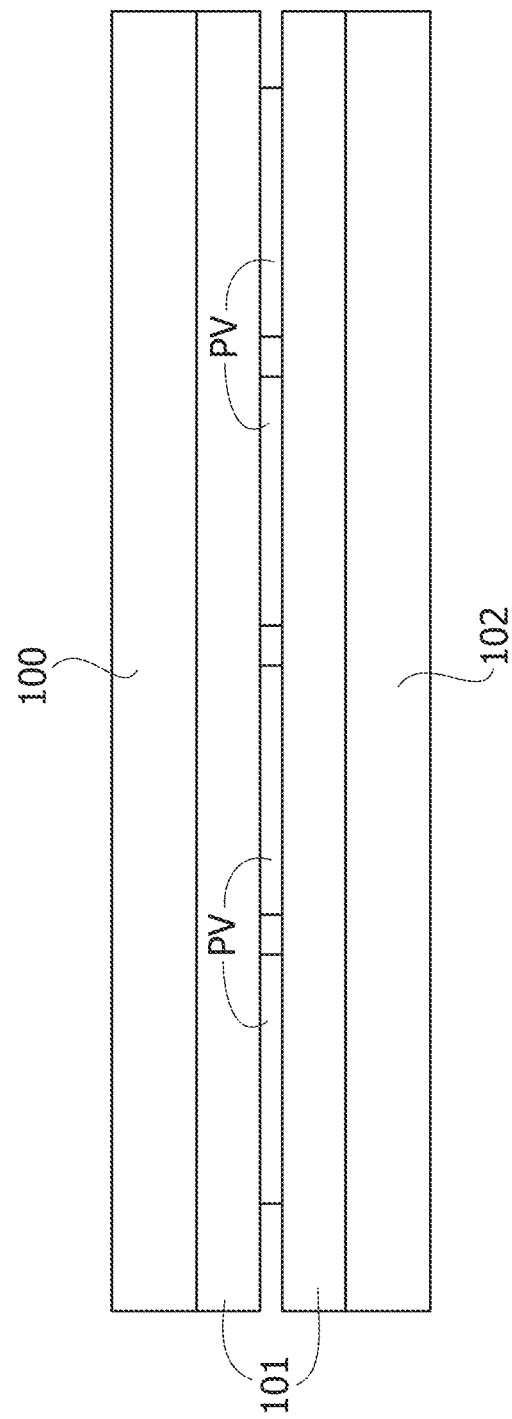
Figure 49:
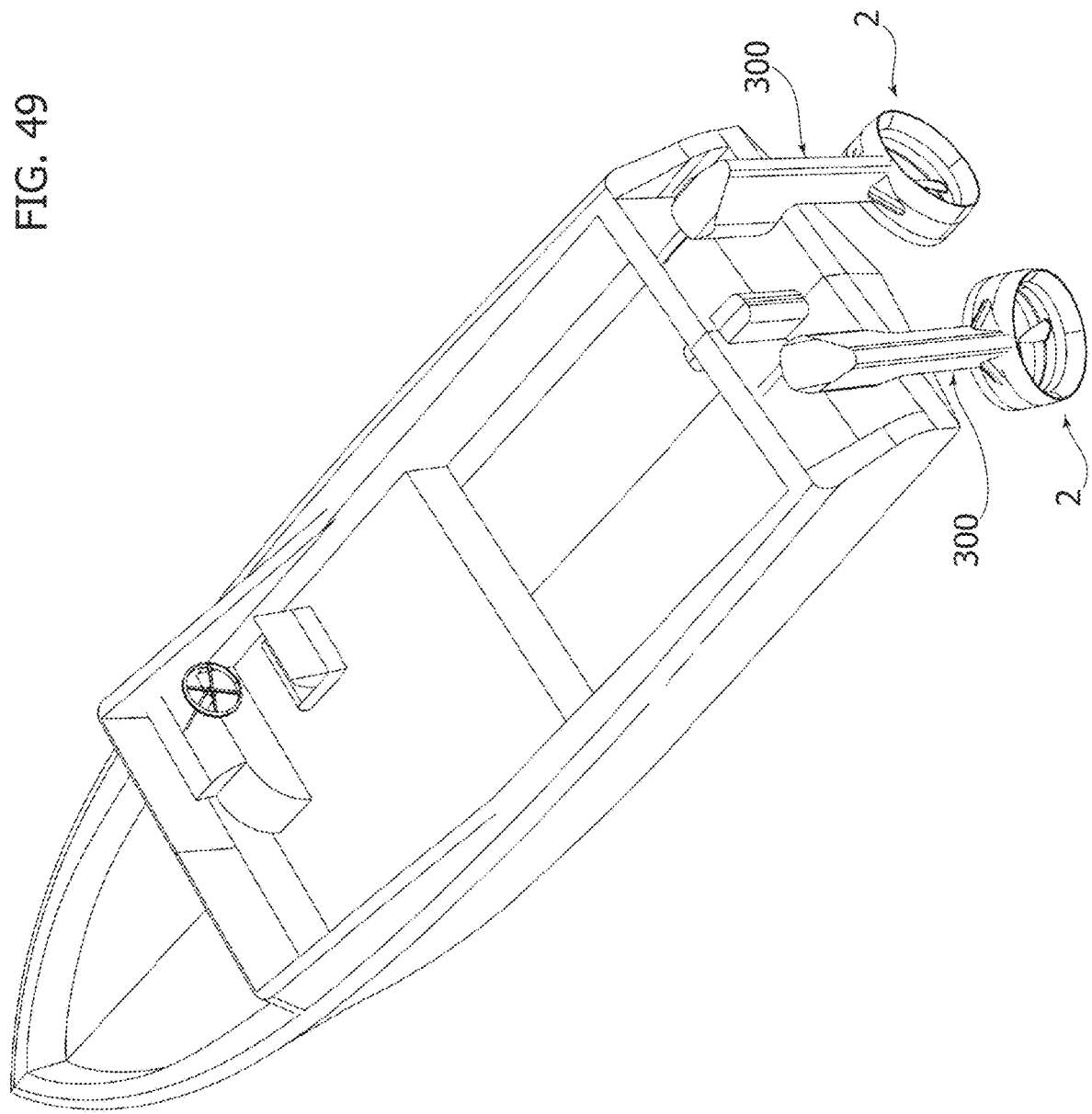

The photovoltaic cells PV are incorporated in a layered laminar structure (FIG. 48), including an outermost layer comprising one or more layers of PET with a UV or ECTFE coating, two layers of a thermoplastic polyolefin material, above and below the cells, to encapsulate the cells, and a back layer of PET with UV coating, or preferably of carbon fiber. The thickness of each layer may vary from 300 to 450 microns, and the total thickness is approximately 1.5-2 mm, which contributes to the structural rigidity of both the wings and the ovaloid module containing the passenger compartment.

According to another aspect, the present invention is also directed to the annular propeller unit taken on its own.

The invention also covers any other type of vehicle comprising one or more annular propeller units according to the invention.

FIGS. 49-55 show an example of application of the invention to a boat. In this example, two annular propeller units 2 are provided, made in accordance with the disclosures of the invention, which have been described above. Each annular propeller unit 2 is carried at a lower end of a upright 300 supported outboard at the stern of the boat, and configured to keep the respective annular propeller immersed in the water.

The stator ring 2B of each annular propeller unit 2 is carried by a lower end of the upright 300, and is arranged with its axis directed orthogonally to the upright 300. The motor unit P is carried at the upper end of the upright 300. The belt B of the belt transmission 5 is guided within the upright 300 by means of rollers 301 and is engaged both on a pulley 6 (see in particular FIGS. 53-55) carried by the shaft of the motor unit P and on the outer surface of the rotor ring 2A.

Each upright 300 can be oriented around its vertical axis, to consequently orient the thrust direction of the respective annular propeller unit 2.

Figure 50:
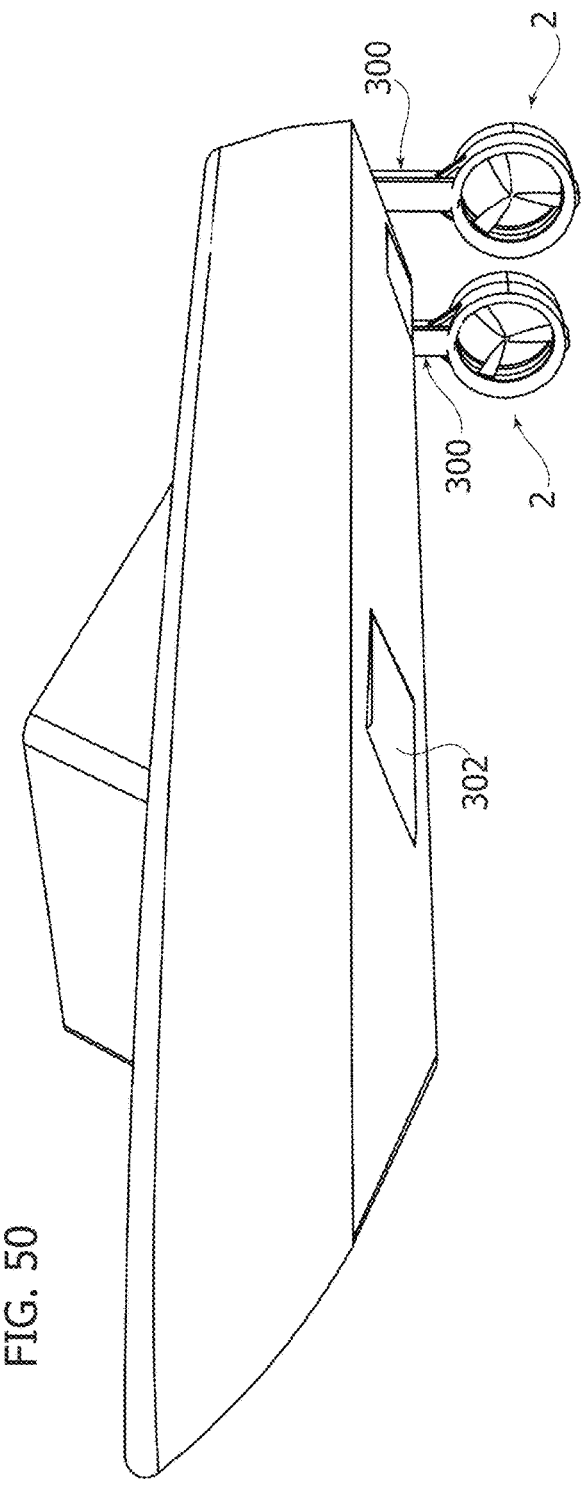
Figure 51:
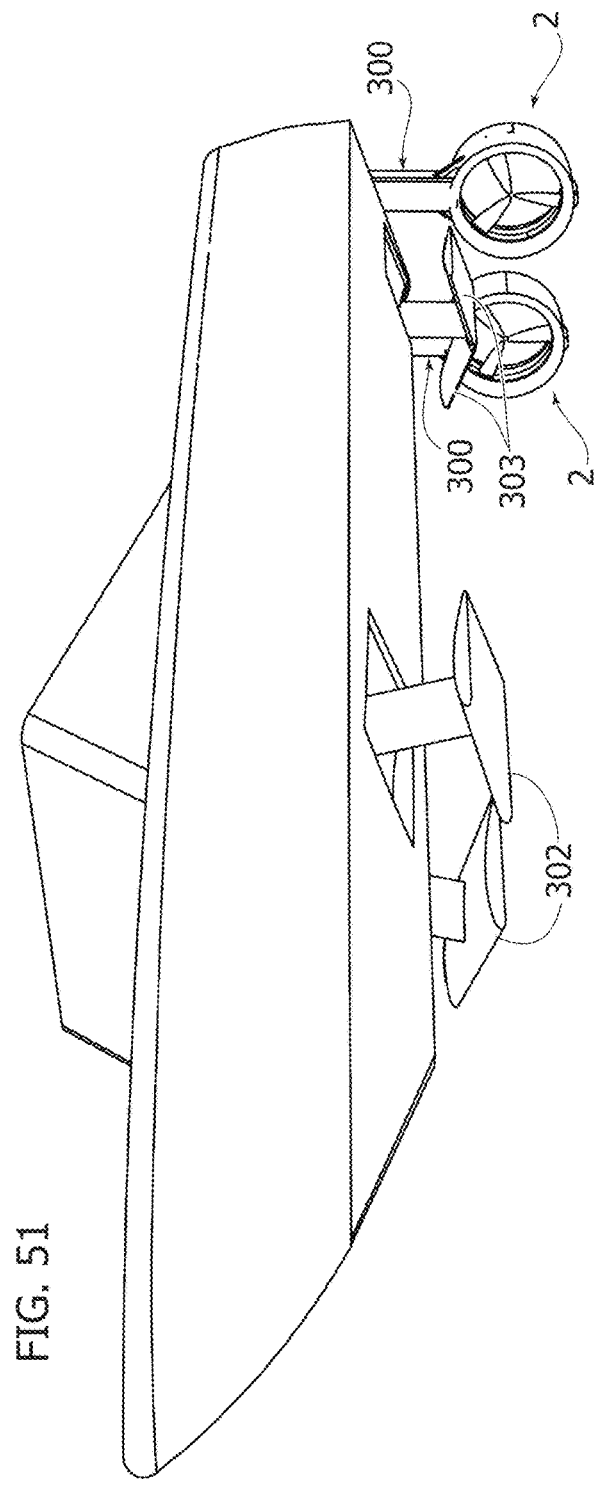

With reference in particular to FIGS. 50, 51, the boat is provided with at least two front hydrofoils 302 and at least two rear hydrofoils 303, which can be moved by means of respective actuators of any known type between an inoperative position adjacent to the hull of the boat (FIG. 50), and an operative position spaced downwards with respect to the hull (FIG. 51). Above a certain navigation speed, the hydrofoils can be extracted to raise the hull above the water and kept in a position that minimizes energy consumption at each cruising speed of the vehicle.

Figure 52:
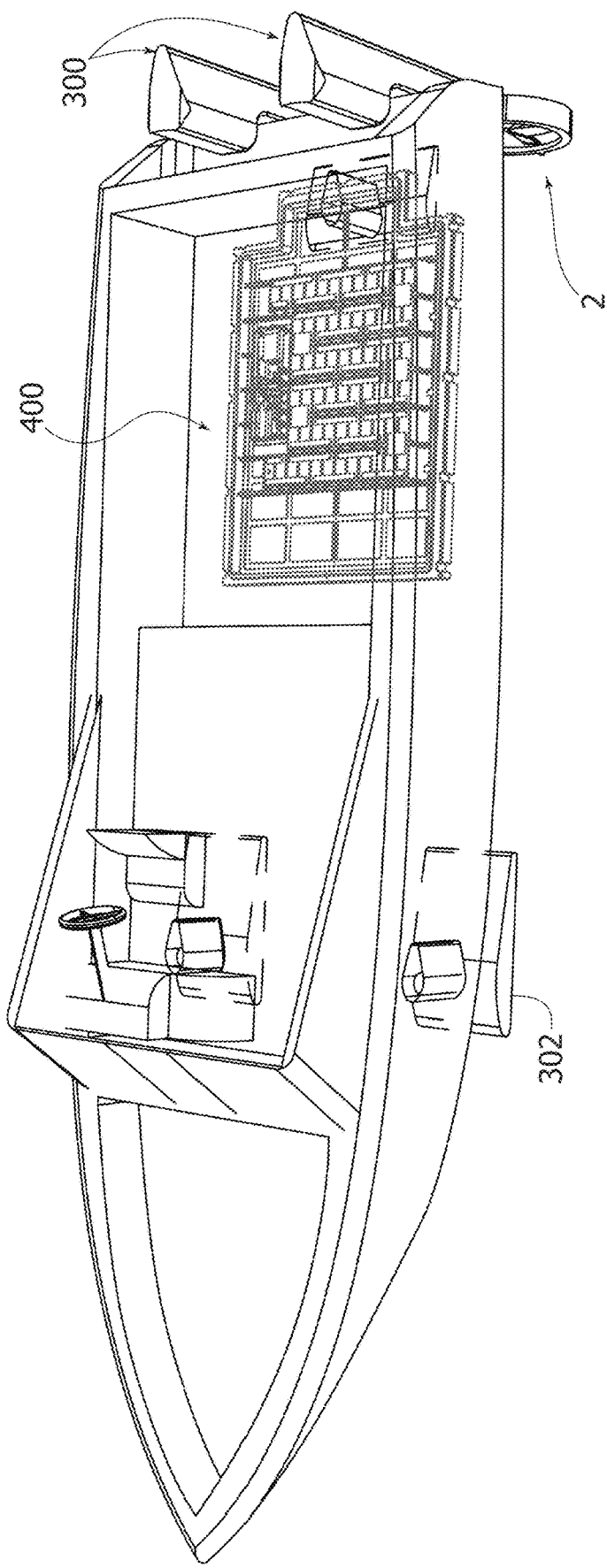
Figure 53:
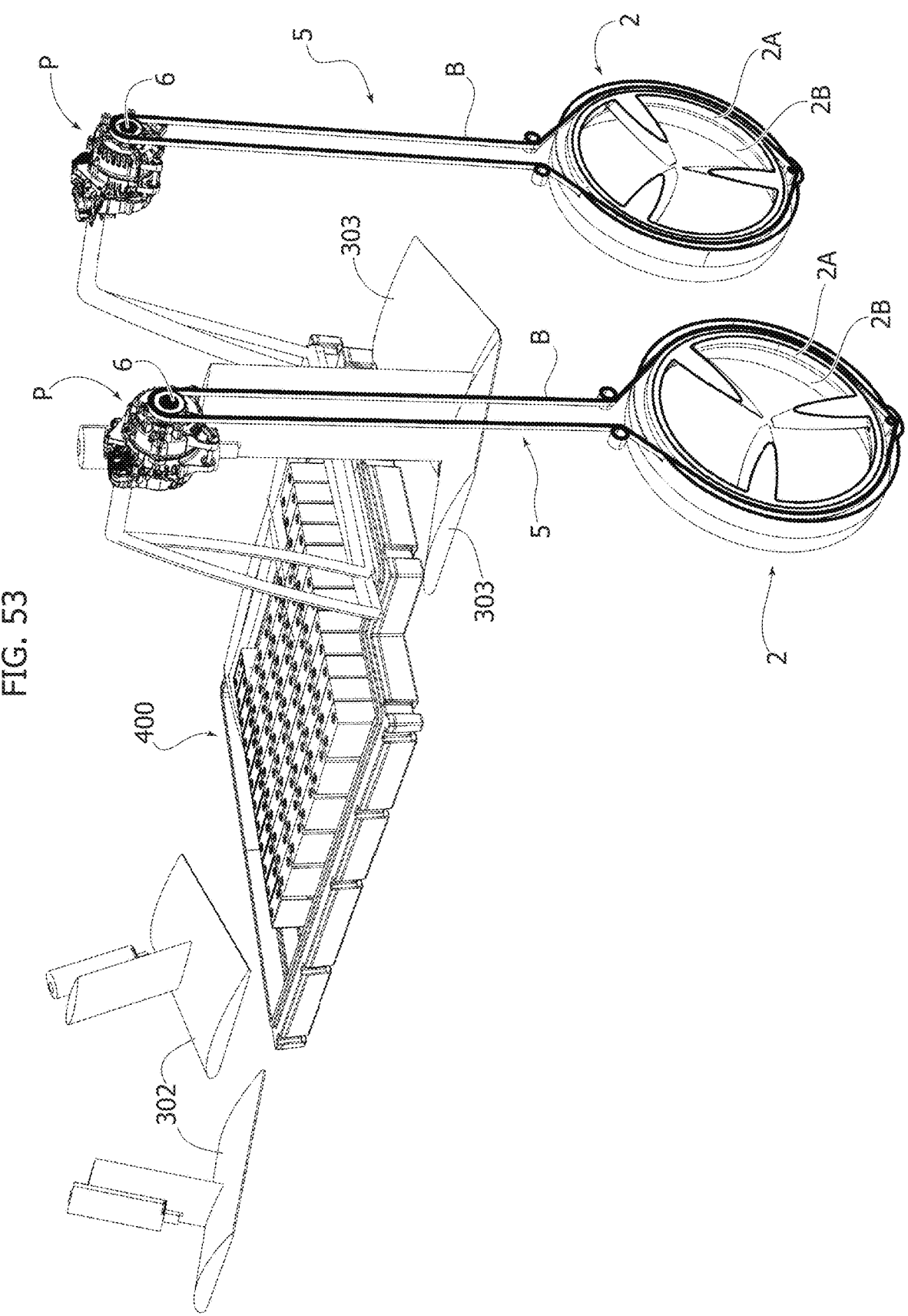
Figure 55:
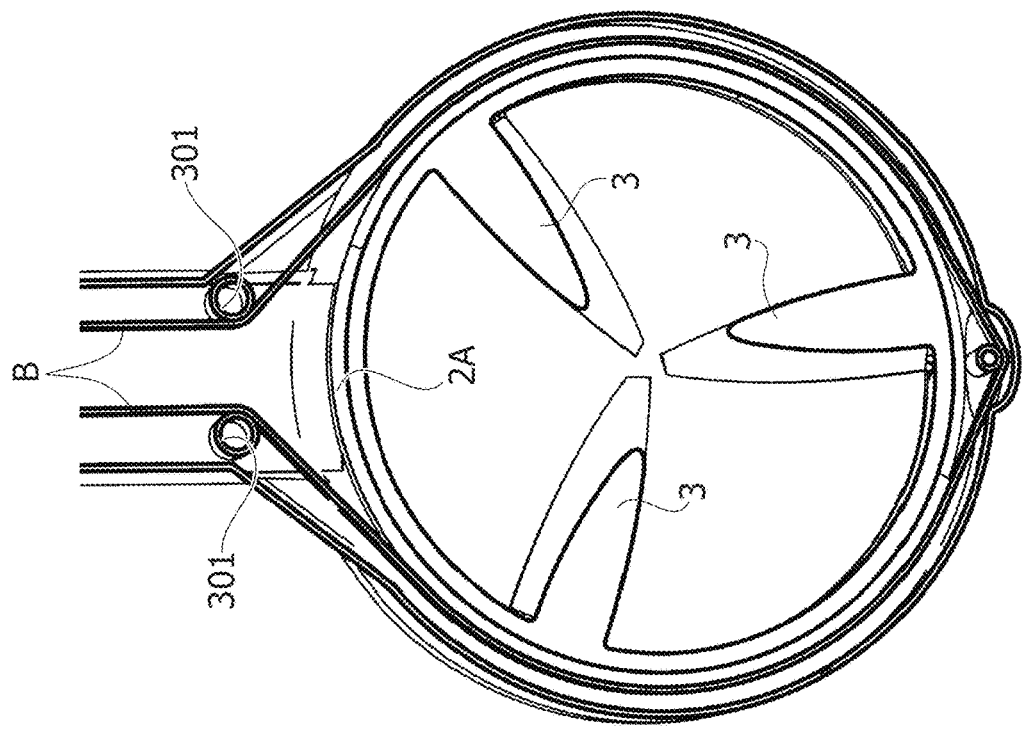
Figure 54:
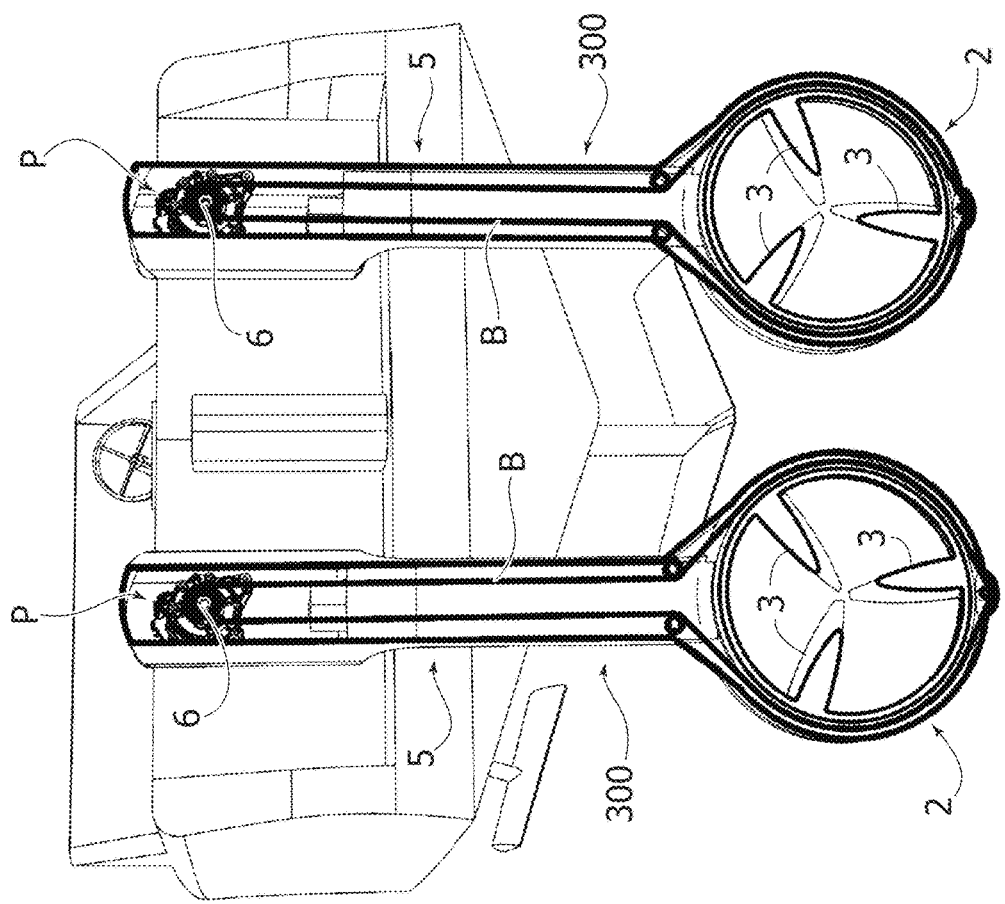

With reference to FIG. 52, a battery pack 400 is housed in the hull for electrically-powering the motor units P. Preferably, this battery pack is made according to the disclosures of the document WO2021070018A1 by the same Applicant.

Of course, without prejudice to the principle of the invention, the details of construction and the embodiments may vary widely with respect to those described and illustrated purely by way of example, without departing from the scope of the present invention, as defined by the attached claims.

The invention claimed is:

1. An aircraft, comprising:
a supporting structure,
one or more annular propellers, supported in rotation by the supporting structure,
wherein each annular propeller comprises:
a rotor ring having a rotor ring axis, and rotatably mounted around said axis within a stationary ring, said stationary ring coaxial with the rotor ring, and forming part of the supporting structure,
one or more blades that extend radially from a body of the rotor ring towards the axis of the rotor ring,
at least one motor unit to drive said one or more annular propellers, said at least one motor unit carried by the supporting structure and having an output shaft spaced apart from an axis of each of the one or more annular propellers which are driven thereby,
said stationary ring including an inner circumferential wall, substantially flush with, and axially on the extension of, an inner circumferential surface of the rotor ring, so as to define with the latter a guide duct for the fluid flow generated by each annular propeller,
said inner circumferential wall of the stationary ring including a circumferential recess within which the rotor ring is arranged and rotatably supported,
one or more belt transmissions, each belt transmission of said one or more belt transmission connects each rotor ring of each propeller of said annular one or more propellers which are driven by said at least one motor unit with the output shaft of the at least one motor unit, each belt transmission of the one or more belt transmissions comprising an endless belt, each endless belt engaged on a pulley mounted on the output shaft of the at least one motor unit and on an outer circumferential surface of the rotor ring body, inside said circumferential recess of each of the one or more propellers, each stationary ring of each propeller of the one or more annular propellers having at least one opening for the passage of each belt of said one or more belt transmissions;
one or more wing surfaces incorporating annular propellers whose rotor rings are driven, individually or in groups, by one or more motor units by respective belt transmissions, and
a tail provided with one or more annular propellers with horizontal axis, the rotor rings of which are controlled, individually or in groups, by one or more motor units by respective belt transmissions.

2. An aircraft according to claim 1, wherein said motor unit comprises an electric motor.

3. An aircraft according to claim 1, wherein said motor unit comprises an electric motor and a reducer.

4. An aircraft according to claim 1, wherein the belt has a cross-section that is trapezoidal in shape and is received in a shape-coupling fashion within a circumferential cavity of the outer circumferential surface of said rotor ring.

5. An aircraft according to claim 1, wherein the belt has a body of elastomeric material incorporating one or more wires of metal material.

6. An aircraft according to claim 1, wherein the rotor ring is rotatably supported within said circumferential recess by interposition of one or more elastic leaves arranged circumferentially on an upper surface and on a lower surface of the body of the rotor ring, and cooperating with facing stationary walls of said recess.

7. An aircraft according to claim 6, wherein said one or more elastic leaves are wavy leaves, configured to generate, due to the rotation of the rotor ring, an airflow that provides an air support for the rotor ring.

8. An aircraft according to claim 6, wherein said one or more elastic leaves define a circumferential cup spring associated with each of the upper and lower surfaces of the rotor ring and cooperating with stationary walls facing them.

9. An aircraft according to claim 8, wherein said cup spring consists of one or more portions of metal leaf having a plurality of notches that define a plurality of portions separated from each other and having, on their radially inner side, a folded edge configured to perform the function of a cup spring portion.

10. An aircraft according to claim 1, wherein the rotor ring is rotatably supported within said recess by means of one or more circumferential arrays of bearings with rolling balls or rollers.

11. An aircraft according to claim 10, further comprising an upper circumferential array of bearings with rolling balls, the balls in contact with the upper circumferential surface, or with the outer lateral surface of the rotor ring, and a lower circumferential array of supports with rolling balls in contact with the lower circumferential surface or with the outer lateral surface of the rotor ring.

12. An aircraft according to claim 1, further comprising at least one crossbar extending diametrically through the central opening of each annular propeller, the bar having its opposite ends rigidly connected to the stationary structure and bearing a pin on which a hub that is connected to the rotor ring is mounted in rotation.

13. An aircraft according to claim 12, wherein the aforesaid rotating hub is rigidly connected to the rotor ring by means of the blades or by means of spokes.

14. An aircraft according to claim 12, wherein each crossbar has an elliptical cross-section.

15. An aircraft according to claim 1 further comprising a single disc-shaped wing surface.

16. An aircraft according to claim 1, wherein the same annular propeller is driven by two electric motors arranged on opposite sides with respect to the annular propeller, by means of a single transmission belt, which engages the rotor ring of the annular propeller and two pulleys driven, respectively, by the two electric motors.

17. An aircraft according to claim 1, further comprising an annular propeller driven by an electric motor located on one side of the annular propeller, by means of a transmission belt, which engages both the rotor ring of the annular propeller and a pulley driven by the electric motor, and an auxiliary pulley, arranged on the opposite side of the annular propeller, which is supported freely rotatable, by a belt-tensioning member.

18. An aircraft according to claim 1, further comprising a configuration with two annular propellers, or two groups of annular propellers, arranged at opposite ends of the aircraft and having axes coinciding with each other and parallel to a longitudinal axis of the aircraft, in such a way that the aircraft is able to take off and land in a vertical attitude, such that the longitudinal axis directed vertically, but is able to assume a horizontal flight attitude.

19. The aircraft according to claim 1, wherein said annular propeller is hubless and radially inner ends of the one or more blades are unconnected to each other.

* * * * *